United States Patent [19]

Fassauer

[11] Patent Number: 5,101,615
[45] Date of Patent: Apr. 7, 1992

[54] AIR-FLOATED APPARATUS

[76] Inventor: Arthur L. Fassauer, 420 Foster La., Canyon, Tex. 79015

[21] Appl. No.: 528,718

[22] Filed: May 24, 1990

Related U.S. Application Data

[63] Continuation-in-part of Ser. No. 395,799, Aug. 18, 1989, abandoned.

[51] Int. Cl.[5] .............................................. A01D 87/00
[52] U.S. Cl. ..................................................... 56/12.8
[58] Field of Search ............... 56/12.8, 12.9, 13.1–13.4, 56/16.7, 17.1, 475, 479; 15/300 R

[56] References Cited

U.S. PATENT DOCUMENTS 4,817,372  4/1989  Toda et al. ............................ 56/12.8

FOREIGN PATENT DOCUMENTS 2028089  3/1980  United Kingdom ................. 56/12.8

Primary Examiner—Thuy M. Bui
Attorney, Agent, or Firm—W. Kirk McCord

[57] ABSTRACT

An air-floated apparatus, such as a lawn mower or vacuum cleaner, is comprised of an endless housing having a bottom opening defined by a relatively flat plate member projecting inwardly from a bottom part of the housing. At least one air impeller is provided for pressurizing air within the housing sufficient to float the housing above a support surface. The plate member directs air laterally into the housing to inhibit the escape of air from the housing and maintain a relatively constant pressure in the housing. In one embodiment the apparatus is comprised of a lawn mower having a rotatable cutting member mounted within the housing. The rotary action of the cutting member centrifuges grass cuttings within the housing. The plate member acts as a shelf to support the centrifuged grass cuttings and cooperates with an inner wall of the housing to direct the grass cuttings into a discharge duct for collection in a bag or other receptacle.

30 Claims, 18 Drawing Sheets

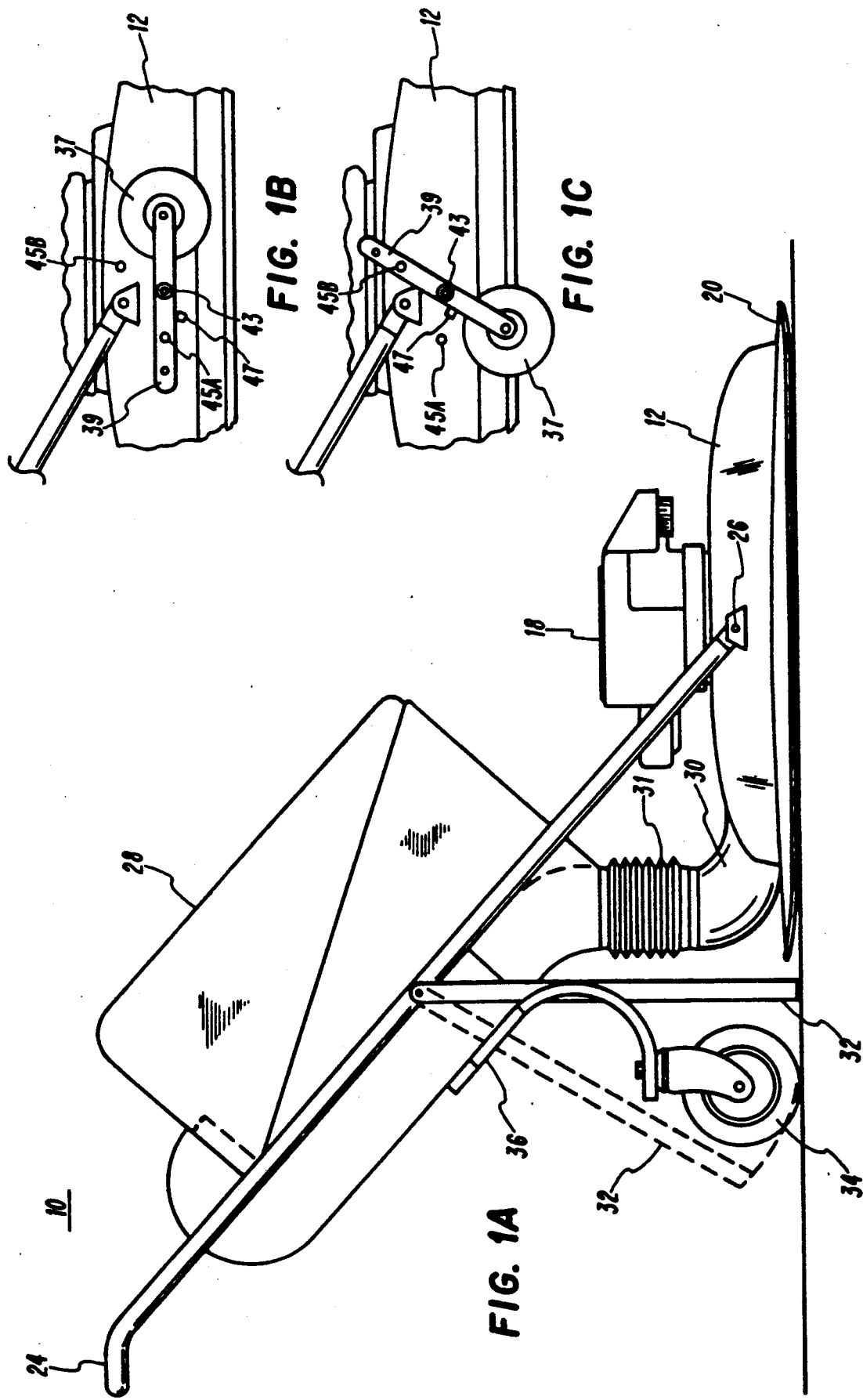

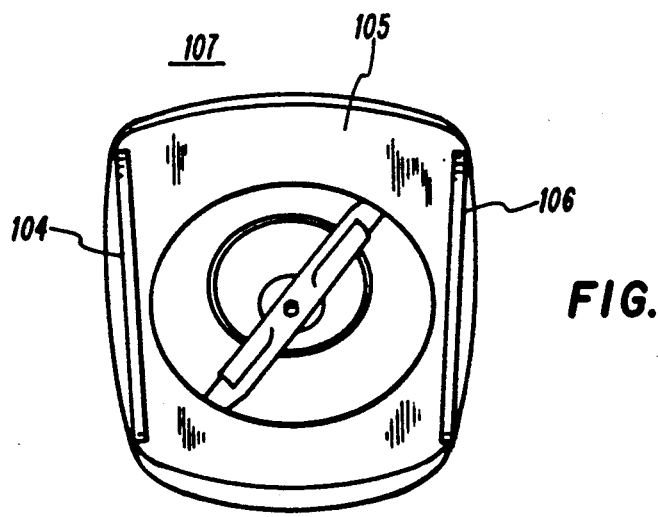
FIG. 9
FIG. 10A
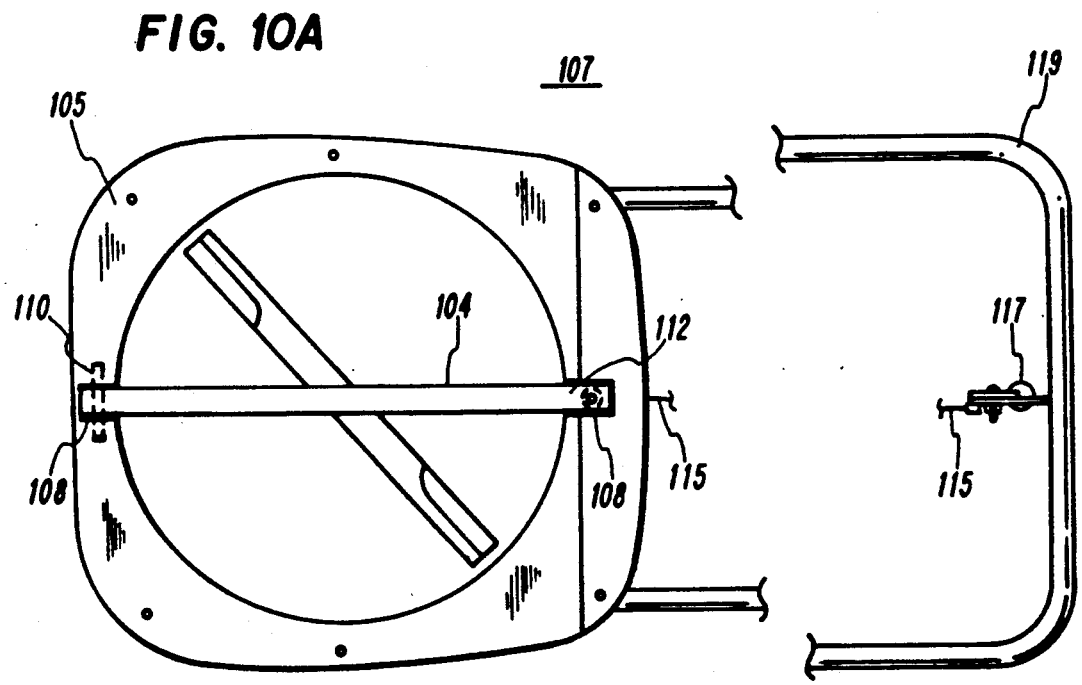
FIG. 10B
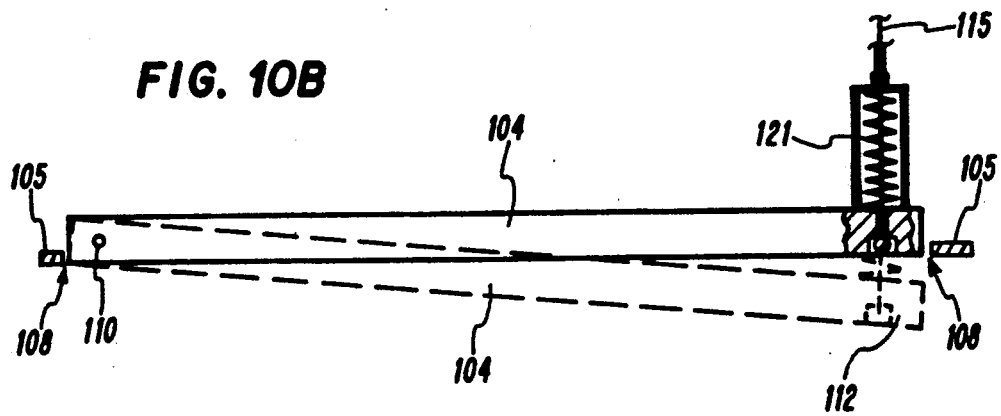

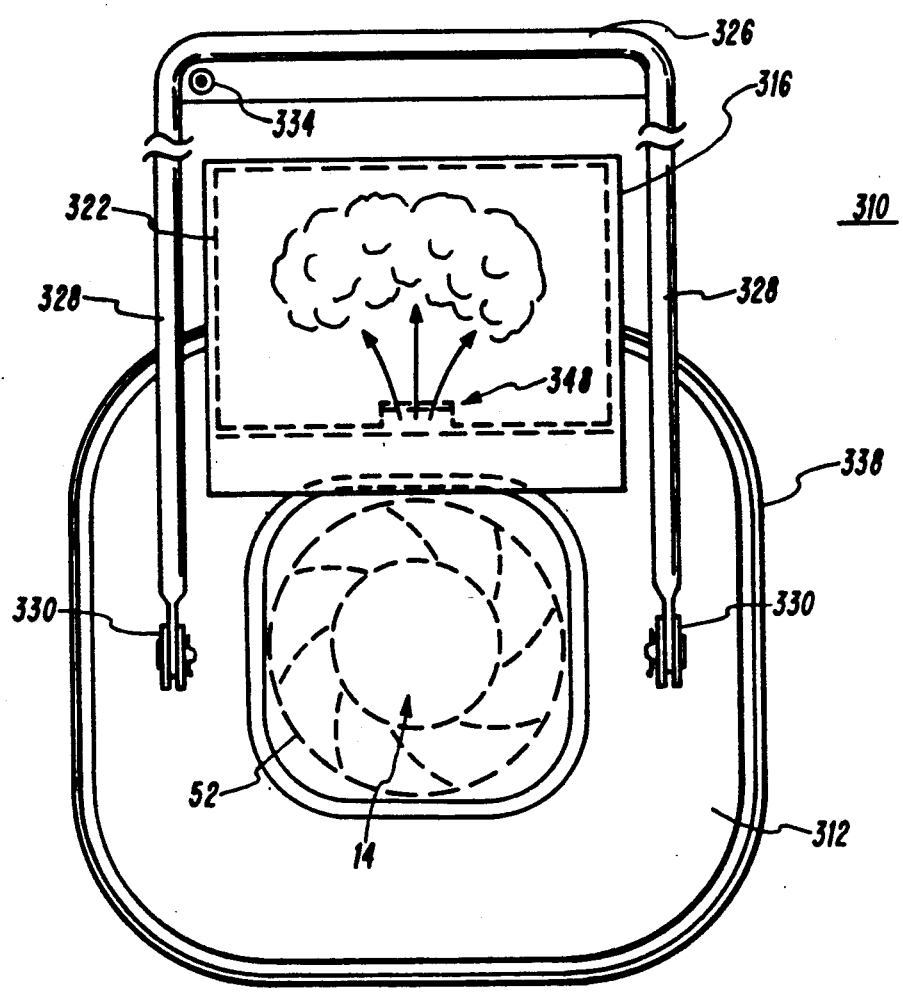
FIG. 23
FIG. 24
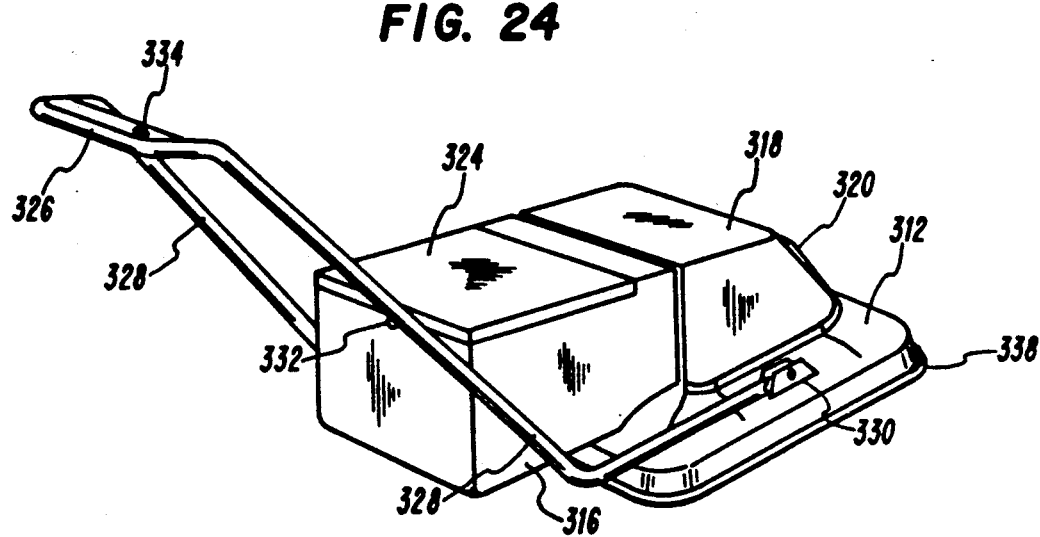

AIR-FLOATED APPARATUS

This is a continuation-in-part of copending patent application Ser. No. 07/395,799, filed Aug. 18, 1989, now abandoned.

FIELD OF THE INVENTION

This invention relates generally to apparatus, such as lawn mowers, string trimmers, vacuum cleaners and the like, and in particular to air-floated apparatus in which at least a portion of the apparatus is pressurized to float the apparatus on a cushion of air.

BACKGROUND OF THE INVENTION

Lawn mowers are in common use for cutting grass and other vegetation to a desired height. String trimmers and edgers are also used to cut grass, weeds and the like along the borders of lawns, particularly where the lawn abuts an obstruction, such as a fence or a wall.

Lawn mowers typically include a predetermined number of wheels to support the mower a predetermined distance above the ground. The mower housing is typically adjustable to select the desired height of the cutting blade to effect the desired cut. The wheels make it difficult to maneuver the law mower around obstacles and to otherwise turn the mower. Self-propelled rotary lawn mowers remove some of the labor involved in moving the mower around the lawn, but considerable effort is still required to guide and turn the mower.

Apparatus for cleaning dust and debris from carpets and floors are also well-known and in common use. One such apparatus, which is commonly referred to as a "carpet sweeper", includes a rotating member disposed beneath the head of the carpet sweeper for contacting the surface to be cleaned to sweep dirt and debris into a dirt collection receptacle. The rotary action of the rotating member is achieved by manually pushing the carpet sweeper across the floor or carpet. Electrically powered cleaning apparatus rely on vacuum suction to remove dirt from a surface, such as a floor or carpet, and to collect the dirt into a bag or other receptacle attached to the vacuum cleaner. A rotating brush is typically disposed beneath the head of the vacuum cleaner for stirring up dust and other debris to introduce the dust and debris into the vacuum suction.

Prior art vacuum cleaners are limited in their use to a fore and aft motion because of the wheels on which the vacuum cleaner is supported. Furthermore, the cleaning area is limited to a relatively narrow area at the front of the vacuum cleaner. There have been relatively few improvements in vacuum cleaner technology. One such improvement incorporates a self-propelled feature, which reduces the effort associated with operating the vacuum cleaner, but considerable effort is still required to guide and turn the vacuum cleaner

DESCRIPTION OF THE PRIOR ART

It is known in the art to provide wheel-less grass cutting apparatus, which have a power operated rotary cutter and commonly driven air impelling means for causing air to be introduced into the mower housing and directed downward toward the ground to produce a reaction force with the ground (the so-called "ground effect"), thereby supporting the mower a small distance above the ground on a cushion of air.

Prior air "air-cushioned" lawn mowers typically have a relatively narrow bottom surface or border in facing relationship with the ground. During operation, air blown toward the ground by the air impelling means tends to escape from the housing between the ground and bottom surface, which substantially reduces the lifting force on the housing. The rapid escape of air along the periphery of the mower housing also stirs up debris and dust when mowing around shrubbery and the like, which makes mowing difficult and hazardous. Also, because the air is blown downward to keep the housing afloat, the air pressure depresses the grass, causing the cutting blade to leave an uneven cut. Other problems associated with prior art air-cushioned lawn mowers include the problem of keeping the mower on a straight cutting path and the mower housing level. Any tilting action on the housing results in an uneven cut.

The relatively narrow bottom surface of the housing also causes the mower to sink relatively deep into the grass when the mower is not in operation. As a result, upon start-up, the cutting blade will tend to "scalp" a section of the grass until it rises up to the desired cutting height by air pressure within the housing. The relatively narrow bottom surface of the mower housing also presents safety problems in that the rotating cutting blade is readily accessible when the housing is floated above the ground. An appendage, such as a user's foot, can easily penetrate into the housing, past the narrow bottom surface, thereby resulting in serious injury to the user by contact with the rotating cutting blade.

Perhaps the greatest disadvantage of prior art air-cushioned mowers is their inability to discharge grass cuttings from the mower housing, which leaves a windrow of grass cuttings below the back right side of the mower that must be raked up after mowing. Conventional lawn mowers tend to vacuum up grass by the rotary action of the cutting blade, whereas in prior art air-cushioned mowers, the downwardly blown air which creates the lifting force by ground effect is not sufficient to effectively discharge grass cuttings primarily because of the escape of air from the housing. Also, the downwardly blown air tends to depress the grass before cutting, which further detracts from the grass catching capability of the mower and results in an uneven cut.

A major problem associated with prior art trimmer devices is the difficulty in holding the device at a desired level above the ground for proper trimming or edging adjacent to sidewalks, fences, trees and the like, which results in an uneven and erratic cutting depth. Trimmer devices typically have long shafts with the trimmer head mounted at one end of the shaft. The user typically holds the shaft at an intermediate position thereon, such that the torque exerted by the weight of the trimmer head, acting along the lever arm of the shaft, exerts a strain on the user's lower back, which can result in injury to the user and at the very least, discomfort during the trimming operation.

SUMMARY OF THE INVENTION

In accordance with the present invention, an air-floated apparatus, such as a lawn mower or vacuum cleaner, includes a substantially endless housing having an open bottom and an air intake opening, the housing being adapted to cooperate with a support surface beneath the housing to define a substantially enclosed chamber. Means is provided for pressurizing air in the chamber sufficient to float the housing above the support surface. The apparatus further includes means projecting from a bottom part of the housing laterally into the chamber to direct air inwardly within the chamber. The projecting means extends from the bottom part of the housing around substantially the entire perimeter of the housing to define the open bottom. The projecting means substantially reduces air leakage from the chamber to maintain a relatively constant pressure within the housing.

In accordance with one embodiment of the invention, the apparatus is a lawn mower having rotatable cutting means located in the chamber. The lawn mower further includes a discharge duct extending through the housing for discharging cuttings from the chamber. The projecting means defines a platform protruding into the chamber from around substantially the entire bottom perimeter of the housing. The platform is adapted to cooperate with an inner wall of the housing to channel cuttings centrifuged within the housing by the rotary action of the cutting means into the discharge duct.

In accordance with another embodiment of the invention, the apparatus is a vacuum cleaner comprising, in combination, a housing having a bottom opening; a shroud located within the housing for dividing the interior of the housing into a pressure chamber and a vacuum chamber; means for pressurizing the air in the pressure chamber to float the housing above a support surface; and means for exhausting air from the vacuum chamber to create a vacuum for suctioning material from the support surface beneath the housing. The housing includes an inlet opening for supplying air to the pressure chamber and means is provided for communicating with the vacuum to collect the material exhausted therefrom.

Incorporating the plate member described above into an air-floated apparatus, such as a lawn mower, provides several advantages. In addition to reducing air leakage from the housing of the apparatus, as previously described, the plate member acts as a shelf and cooperates with an inner wall of the housing to channel grass cuttings thrown against the inner wall of the housing by the centrifugal force of a rotating lawn mower blade into a discharge duct. The relatively high pressure inside the housing discharges air and grass cuttings from the housing at a relatively high velocity, which facilitates the collection of grass cuttings in a receptacle attached to the discharge duct. Alternatively, the discharge duct can be oriented so as to broadcast the grass cuttings over the area being mowed after the cuttings have been mulched by the cutting blade. Furthermore, the plate member will direct downward flowing air inwardly within the lawn mower housing, so that the lateral air flow tends to lift and straighten the grass to provide a more even cut. The plate member also acts as a "glide plate" to reduce drag on the housing as it is moved along the ground or other support surface, thereby enhancing the stability and handling characteristics of the apparatus. Furthermore, air flowing beneath the plate member will act on a relatively flat undersurface thereof to further enhance the lifting force exerted on the housing. Incorporating the plate member described above into an apparatus, such as an air-floated vacuum cleaner, enhances the stability and handling characteristics of the vacuum cleaner as well as the lifting force on the housing. The plate member also serves to isolate the pressure chamber from the vacuum chamber within the vacuum cleaner housing, while still allowing some communication therebetween for proper vacuum cleaner operation.

BRIEF DESCRIPTION OF THE DRAWINGS

Other objects and advantages of the invention will be apparent from the Detailed Description and Claims when read in conjunction with the accompanying drawings wherein:

FIG. 1A is a side elevation view of a first embodiment of an air-floated lawn mower, according to the present invention;

FIGS. 1B and 1C are detailed views of a wheel support mechanism for the lawn mower of FIG. 1A;

FIG. 9 is a bottom plan view of still another alternate embodiment of an air-floated lawn mover, according to the present invention;

FIG. 10A is a bottom plan view of an alternate embodiment of the lawn mover of FIG. 9;

FIG. 10B is a side elevation view of a stabilizer included in the air-floated lawn mower of FIG. 10A, showing the stabilizer in both the extended and retracted positions;

FIG. 23 is a top plan view of the vacuum cleaner of FIG. 21, which illustrates in phantom the collection of dust and debris in a rear-mounted receptacle;

FIG. 24 is a rear perspective view of the vacuum cleaner of FIG. 21;

DETAILED DESCRIPTION OF THE PREFERRED EMBODIMENT

Figure 2B:
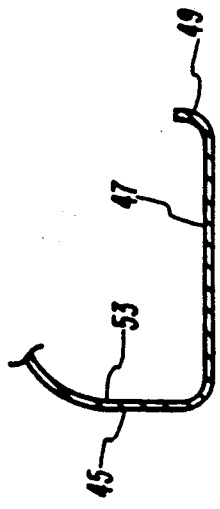
FIG. 2B is a sectional view of a bottom part of a lawn mower housing according to the present invention.

In the description which follows like parts are marked throughout the specification and drawings, respectively. The drawings are not necessarily to scale and in some instances proportions have been exaggerated to more clearly depict certain features of the invention.

AIR-FLOATED CUTTING APPARATUS

Referring to FIGS. 1A-1C, 2A and 2B, an air-floated lawn mower 10 includes an endless housing 12 in which a rotary air impeller 14 and a rotary cutting blade 16 are mounted for common rotation by a power source 18. Power source 18 is operatively mounted on top of housing 12 in a generally central location by conventional fastening means (not shown). Power source 18 can be an AC or DC electric motor or, alternatively, a conventional lawn mower gasoline engine.

Housing 12 is generally trapezoidal in shape and is preferably made of plastic formed by an injection molding process to provide a lightweight housing. A substantially flat external lip member 20 is curved upwardly at an outer portion thereof around substantially the entire bottom part of housing 12, as best seen in FIG. 2A. Housing 12 has a plurality of air intake openings 22 located in a top part thereof and a substantially open bottom. A handle 24 is pivotally attached, as indicated at 26, to respective opposite sides of housing 12 to allow a user to control the movement of lawn mower 10.

A grass-collection receptacle 28, which is preferably made of plastic formed by an injection molding process to reduce the weight thereof, is mounted on handle 24 for accumulating grass cuttings and the like discharged from housing 12 through a rearwardly extending discharge duct 30. A support stand 32 is pivotally attached to handle 24 for supporting the weight of receptacle 28 when mower 10 is not in operation. When lawn mower 10 is in operation, support stand 32 is pivoted upwardly, as shown by the dashed lines in FIG. 1. As an alternative to support stand 32, a swivel roller 34 is pivotally attached to a curved brace member 36, which is in turn secured to discharge duct 30, to support the weight of receptacle 28 and contents thereof both when mower 10 is in operation and not in operation. Attached to duct 30 is a flexible member 31, which expands and contracts to allow housing 12 to float.

A pair of wheels 37 (only one of which is shown in FIGS. 1B and 1C) are mounted on respective opposite sides of housing 12 for contacting the ground to facilitate the movement of lawn mower 10 when mower 10 is not in operation. Each wheel 37 is coupled to a lever arm 39 having an opening therein. Lever arm 39 is pivotally attached to shaft 43 extending outwardly from housing 12. First and second detents 45A and 45B are mounted on each side of housing 12 for mating with the opening in the corresponding lever arm 39. When lever arm 39 is substantially horizontal as shown in FIG. 1B, first detent 45A engages the opening in lever arm 39 to hold wheel 37 in a retracted position, which is the desired position when mower 10 is in operation. When lever arm 39 is rotated upwardly, such that detent 45B engages the opening in lever arm 39, wheel 37 is rotated downward to contact the ground, as shown in FIG. 1C. A stop member 47 limits the rearward movement of wheel 37, such that lever arm 39 is aligned at an angle of approximately fifteen degrees with respect to a vertical axis perpendicular to the ground. Lever arm 39 is sufficiently flexible to be movable outwardly from housing 12 to disengage lever arm 39 from the corresponding detent 45A or 45B, in order to change the position of wheel 37.

Referring specifically to FIG. 2A, air impeller 14 is preferably comprised of lightweight plastic material, which may be formed by injection molding. Impeller 14 is configured to draw air into housing 12 through air intake opening 22 and expel the air outwardly from impeller 14 along inner surface 38 of housing 12. The air flow within housing 12 is depicted by arrows 13. Cutting blade 16 is positioned below impeller 14 within housing 12. The spacing between impeller 14 and blade 16 is adjustable by means of shims or spacers 40. The vertical position of cutting blade 16 within housing 12 determines the height of the resulting grass cut.

In accordance with one feature of the invention, a relatively flat plate member 42 projects inwardly from around substantially the entire bottom part of housing 12 to define a substantially endless shelf extending around the inside of housing 12 and defining the open bottom of housing 12. Plate member 42 can be integrally formed on the bottom part of housing 12, or, alternatively, plate member 42 can be attached to the bottom of housing 12 by screws or other suitable attachment devices. Plate member 42 directs at least some of the air flowing downwardly along inner surface 38 of housing 12 substantially laterally, as shown by the inwardly directed arrows 13 at the bottom part of housing 12, thereby substantially reducing air leakage from housing 12, beneath lip member 20. By retaining more air within housing 12, the air pressure within housing 12 is maintained at a relatively constant level to enhance the lifting force acting on housing 12. Reducing air leakage from housing 12 also reduces the amount of dust and debris blown up by the air escaping from beneath lip member 20, particularly when mowing around shrubbery and the like. In operation, housing 12, including impeller 14 and blade 16, rides on a cushion or air which substantially facilitates the movement and handling of lawn mower 10.

In addition to reducing air leakage from housing 12, plate member 42 provides shelf support for grass cuttings, which are thrown against inner surface 38 of housing 12 by the centrifugal action of rotating blade 16. Plate member 42 cooperates with inner surface 38 of housing 12 to channel the centrifuged grass cuttings into discharge duct 30. The relatively high air pressure maintained within housing 12 discharges air and grass cuttings from duct 30 at a relatively high velocity, which substantially enhances the grass catching capability of lawn mower 10. Instead of catching the grass cuttings, discharge duct 50 can be oriented to broadcast the grass cuttings over the area being mowed after the cuttings are mulched by blade 16. One skilled in the art will appreciate that plate member 42 can also be used on non-air-floated mowers to enhance the grass catching capability thereof.

The relatively high air pressure within housing 12 is sufficient to pneumatically discharge grass cuttings through a relatively small discharge duct 30, such as a discharge duct having a diameter of approximately three inches. The capability of discharging substantial amounts of grass cuttings at high pressures through a relatively narrow discharge duct is a significant advantage over prior art air-floated lawn mowers, which cannot effectively discharge grass cuttings because of the problem of air leakage around the periphery of housing 12. Furthermore, the lateral air flow provided by plate member 42 tends to lift and straighten the grass as it is being cut to provide a more even cut.

Plate member 42 cooperates with housing 12 to provide several other advantages. The relatively flat undersurface of plate member 42 acts as a glide plate to reduce the drag on housing 12 as it is moved across the lawn and prevents the bottom edge of housing 12 from sinking too deeply into the grass, which can cause the blade to scalp the grass below the desired cutting height, particularly when the mower is started. Furthermore, the undersurface of plate member 42 also provides a lifting surface, which is acted upon by air pressure between the undersurface of plate member 42 and the ground, thereby enhancing the lifting action on housing 12. Plate member 42 also stabilizes housing 12 against tilting from side to side, and enhances the maneuverability and handling characteristics of the lawn mower.

Plate member 42 can be configured to provide a curved surface on either or both of the top and bottom surfaces as an alternative to the substantially flat plate described above. The inward extension of plate 42 makes it more difficult to contact cutting blade 16 during operation of mower 10 because an object, such as a user's foot, must be extended farther laterally into housing 12 before it can be moved upward into contact with the rotating cutting blade. As shown in FIG. 2A, blade 16 is positioned above plate 42.

Figure 2A:
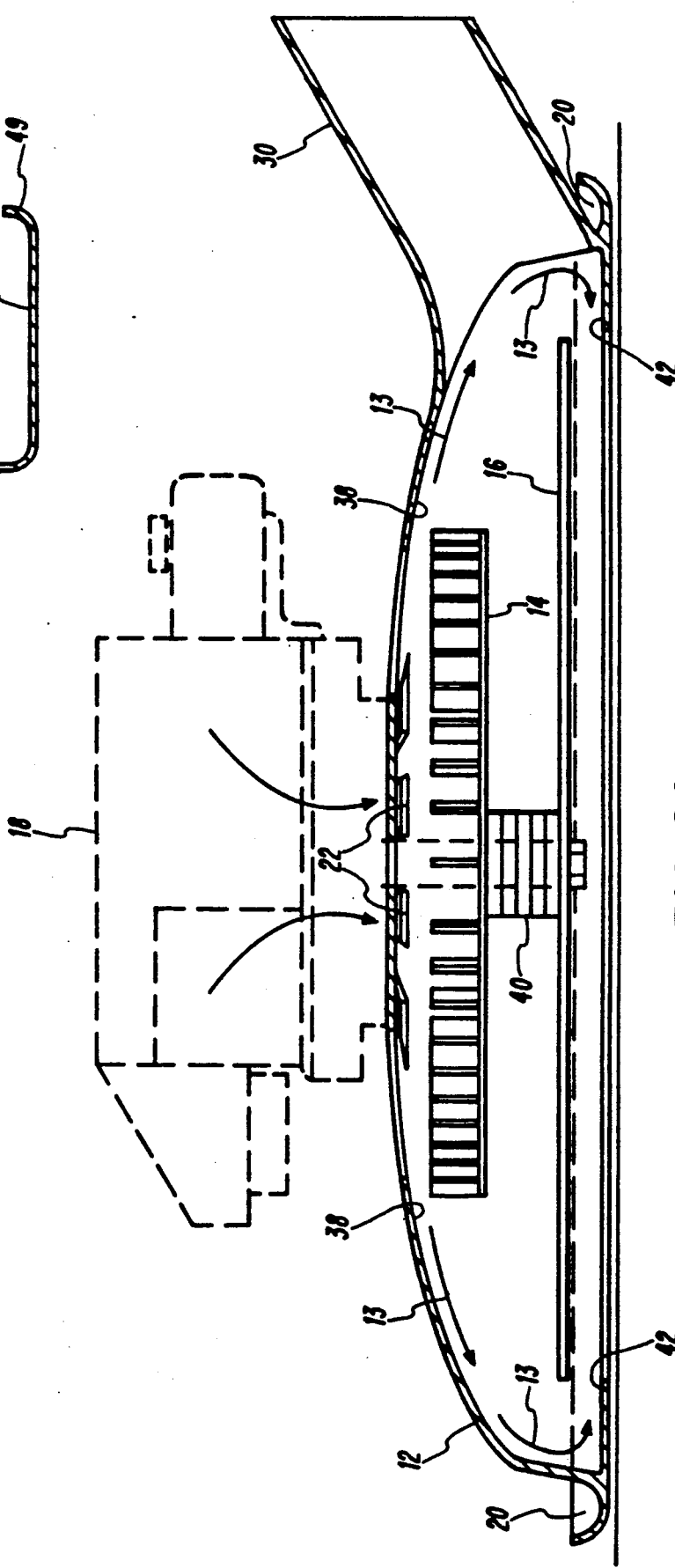
FIG. 2A is a sectional view of a portion of the lawn mower of FIG. 1A.

Referring to FIG. 2B, an alternate embodiment of a housing 45 for an air-floated lawn mower is depicted. Plate member 37 is integrally formed as a bottom part of housing 45 and projects into housing 45 in substantially the same manner as plate member 42, described above. Plate member 47 has a relatively flat or slightly curved surface terminating in an upwardly curved lip 49 inside housing 45. Housing 45 does not have an external peripheral lip member, as described above with reference to housing 12. Inner lip 49 enhances the channeling effect of plate member 47 by trapping more of the grass cuttings between inner wall 53 of housing 45 and lip 49.

Figure 3:
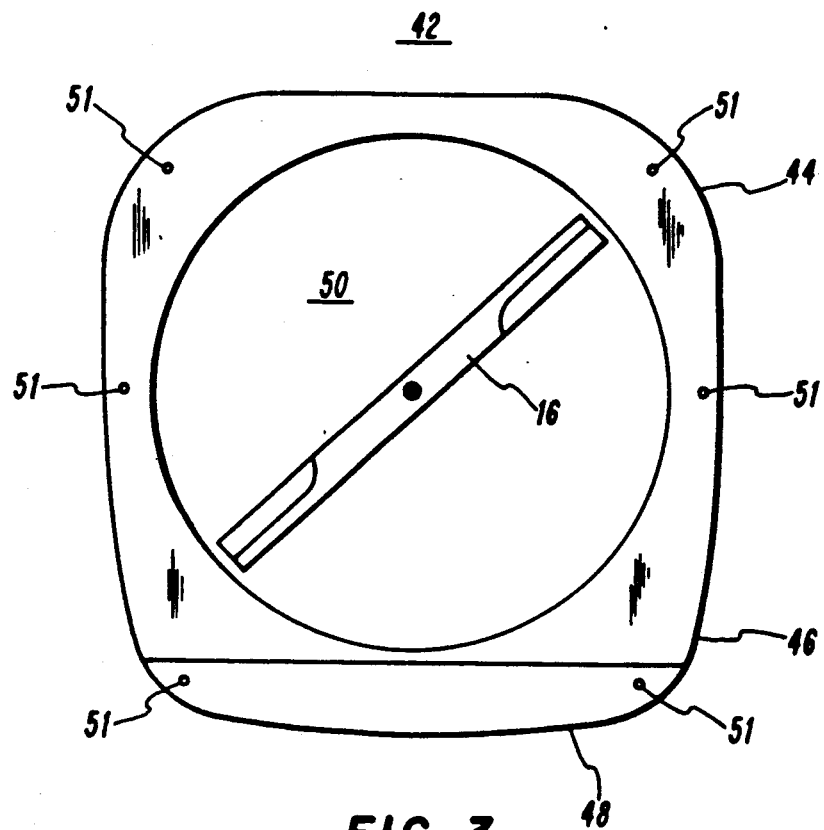
FIG. 3 is a bottom plan view of the housing portion of an air-floated lawn mower, according to the present invention.

Referring to FIG. 3, plate member 42 is substantially trapezoidal in shape to conform to a substantially trapezoidal-shaped housing, such that front portion 44 of plate member 42 is wider than rear portion 46 thereof. Rear portion 46 has a sloped surface 48 extending rearwardly and upwardly from the remainder of rear portion 46 at an angle of approximately five degrees. Plate member 42 has a substantially annular shape with a centrally disposed circular opening 50 for defining a 360° bottom opening of the corresponding housing. In the embodiment illustrated, the diameter of opening 50 is slightly larger than the cutting range of blade 16. In an alternate embodiment, blade 16 can be extended beyond the diameter of opening 50. Plate member 42 has a plurality of openings 51 for receiving threaded screws or the like to attach the plate member 42 to the corresponding mower housing.

Figure 4:
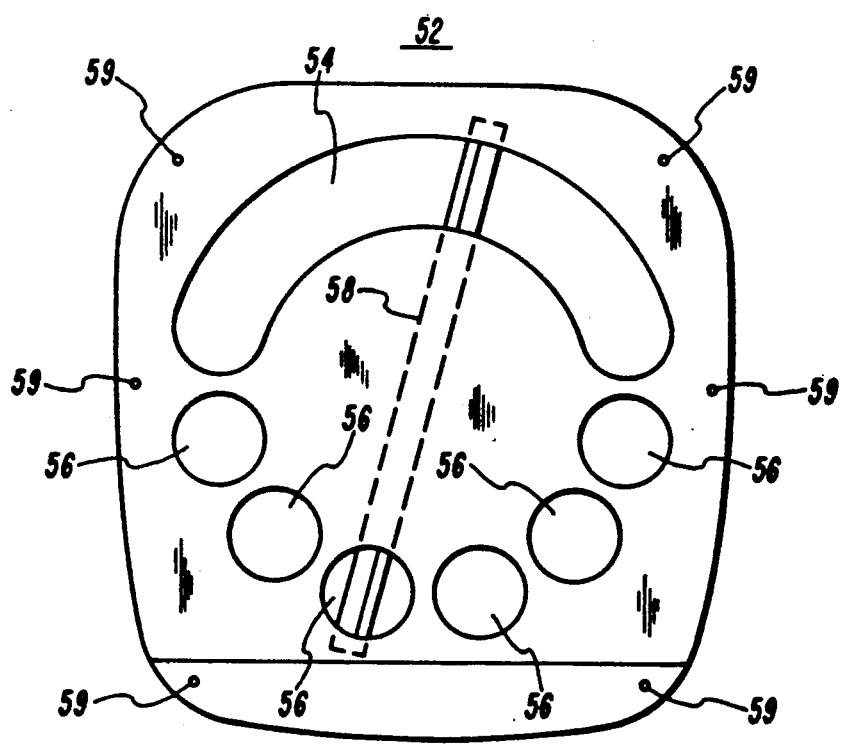
FIG. 4 is a bottom plan view of the housing portion of an alternate embodiment of an air-floated lawn mower, according to the present invention.

Referring to FIG. 4, plate member 52 is similar to plate member 42, illustrated in FIG. 3, as described above, except for the plate openings. An arcuate slot 54 extends along an arc of approximately 180 degrees in a first portion of plate member 52 and a plurality of circular openings 56, the respective centers of which lie along an arc of approximately 180 degrees, are located in a second predetermined portion of plate member 52. In this embodiment cutting blade 58 extends beyond slot 54 in the first portion of plate member 52 and beyond circular openings 56 in the second portion of plate member 52, such that the cutting range of blade 58 is greater than the extent of slot 54 and openings 56. One skilled in the art will appreciate that other configurations of bottom plate members may be used in lieu of the configurations described with reference to FIGS. 3 and 4, while retaining the significant advantages described above. Mounting holes 59 are formed in plate member 52 for mounting the plate member 52 on a bottom portion of a mower housing. Alternatively, plate member 52 can be integrally formed on the corresponding mower housing.

Equipping the mower housing with a plate member which extends around substantially the entire perimeter thereof not only reduces air leakage around the entire perimeter of the housing to enhance the lifting force on the housing, but also helps maintain sufficient air pressure within the housing, to effectively and efficiently discharge grass cuttings from the housing. The rotary action of the mower cutting blade throws the grass cuttings outwardly toward the inner wall of the housing. The plate member provides a shelf to journally support the grass cuttings and cooperates with the inner wall of the housing to enhance the centrifuge effect on the cuttings and channel the cuttings into the discharge duct. The relatively high pressure in the housing discharges the cuttings through the duct at a relatively high velocity, which facilitates the collection of the grass cuttings in a receptacle which communicates with the discharge duct. Alternatively, the discharge duct can be oriented to broadcast the cuttings over the area being mowed after the cuttings have been mulched by the cutting blade.

Figure 5:
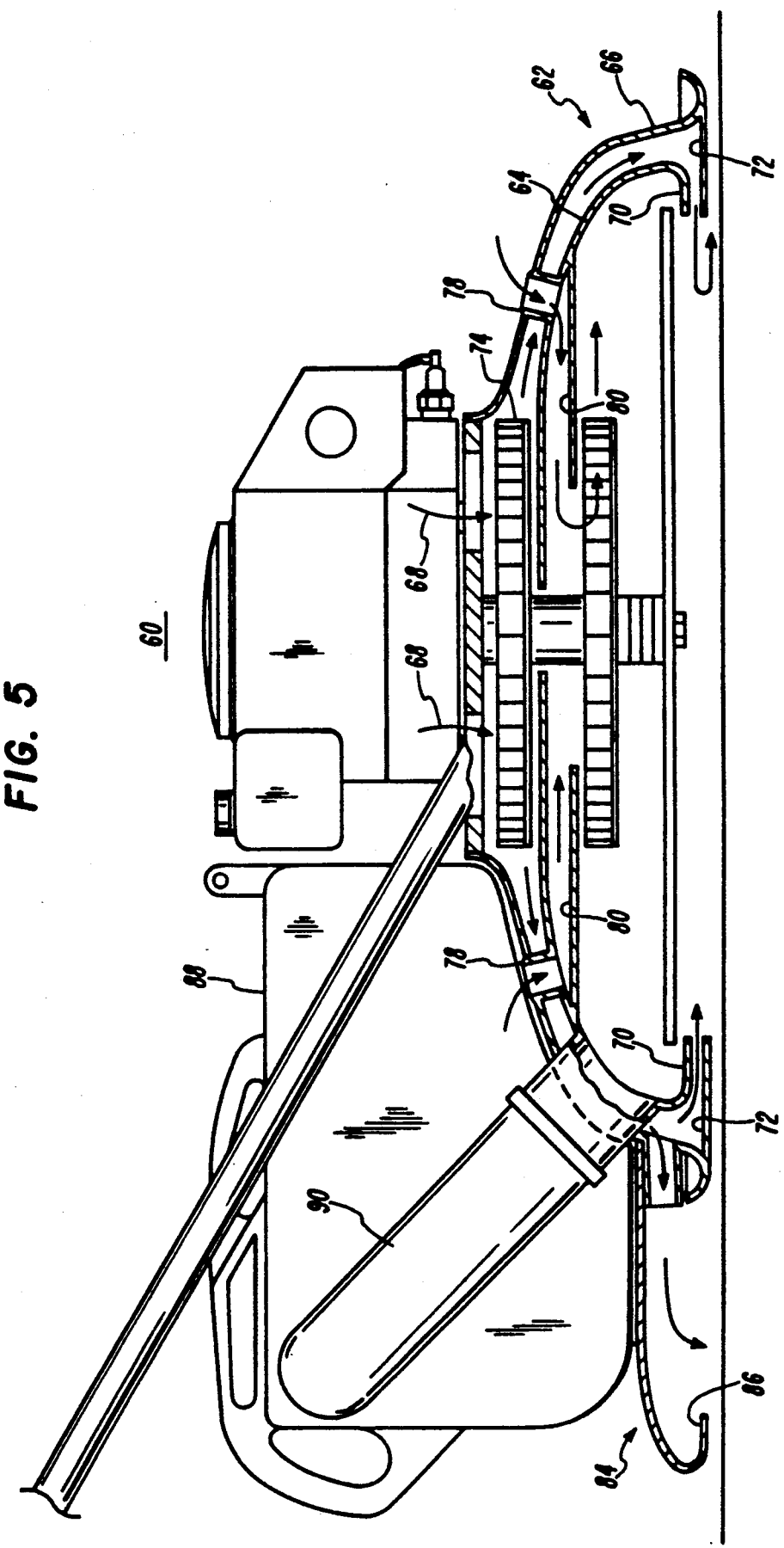
FIG. 5 is a sectional view of another alternate embodiment of an air-floated lawn mower, according to the present invention.

Referring to FIG. 5, an air-floated lawn mower 60 has a housing 62, which is comprised of an inner shroud 64 and an outer shroud 66. Air is drawn through intake openings 68 in outer shroud 66 and flows between inner and outer shrouds 64 and 66, as indicated by arrows 65. Inner and outer shrouds 64 and 66 have respective inner and outer bottom plate members 70 and 72 extending from respective bottom parts thereof inwardly into the open portion of housing 62. Inner bottom plate member 70 is located above outer bottom plate member 72, so that air flowing between inner and outer shrouds 64 and 66 is channeled between plate members 70 and 72, whereby the air is directed inwardly to reduce air leakage along the periphery of housing 62. Air flowing beneath inner bottom plate member 70 will act on an undersurface thereof to enhance the lifting force on housing 62. In an alternate embodiment one of the bottom plate members 70 and 72 can be eliminated, such that either inner shroud 64 or outer shroud 66 has a bottom plate member attached thereto.

A first air impeller 74 is positioned between inner and outer shrouds 64 and 66 for directing the flow of air between inner and outer shrouds 64 and 66 and a second air impeller 76 is positioned within inner shroud 64 for drawing air through intake openings 78 and producing a flow of air within inner shroud 64. A platform 80 is positioned within inner shroud 64 to channel the air flow from intake openings 78 to second air impeller 76, as indicated by the arrows 65. Platform 80 has a central opening, located above impeller 76, to direct the air flow to impeller 76.

The air pressure within housing 62, which is created by the dual impellers, is typically more than is needed to lift housing 62. The excess air can be used in a variety of ways. For example, some of the air produced by first air impeller 74, which flows between inner and outer shrouds 64 and 66, can be bled off into an air pod 84, which is attached to the trailing portion of outer shroud 66. Air pod 84 also includes a relatively flat bottom plate member 86, which extends inwardly into the open region of air pod 84 from a bottom part thereof to reduce air leakage from air pod 84 and maintain a relatively constant air pressure therein. Air pod 84 can be integrally formed by injection molding as an appendage to housing 62 or, alternatively, air pod 84 can be removably attached to housing 62 by any conventional attachment means. Air pod 84 is adapted for supporting a grass-collection receptacle 88, which accumulates the grass cuttings discharged from housing 62 via a discharge duct 90.

In an alternate embodiment (not shown) air pod 84 may be equipped with its own air impeller and drive motor to provide a self-contained pneumatic support apparatus, instead of receiving its air supply from housing 62. One skilled in the art will appreciate that the air pod described above, particularly one having its own air impeller and power source, can be used to support other objects and is not limited in its application to supporting grass-collection receptacles.

Figure 6:
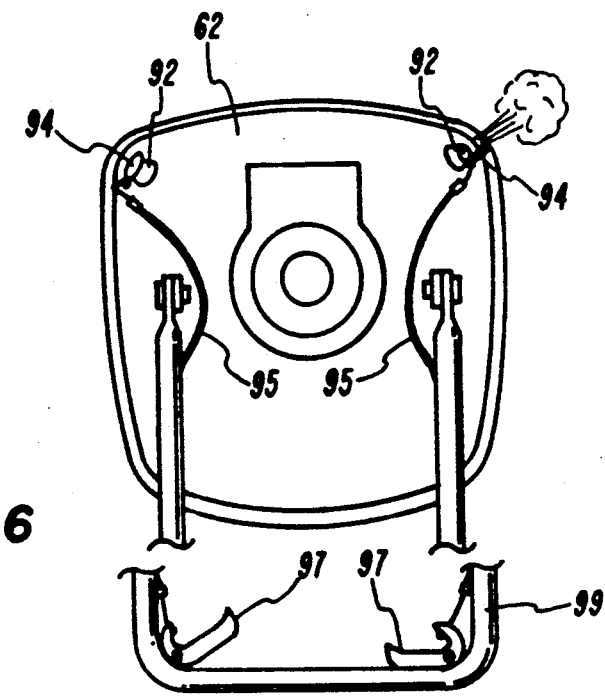
FIG. 6 is a top plan view of yet another alternate embodiment of an air-floated lawn mower, according to the present invention.

In another embodiment excess air created within housing 62 is exhausted from housing 62 via a discharge nozzle 92, as shown in FIG. 6. Nozzle 92 tapers from a diameter of approximately three inches at inner shroud 64 to a diameter of approximately $\frac{3}{4}$ inch to provide a relatively high velocity air discharge from housing 62. In this manner, nozzle 92 acts as an air jet, such that the reaction force caused by the air discharge will tend to move housing 62 in a direction opposite from the direction in which air is discharged from nozzle 92.

Nozzle 92 is selectively used to facilitate the side-to-side movement of mower 60 and the turning action thereof. The rotation of the cutting blade tends to move housing 62 slightly to the left. When nozzle 92 is positioned on the left side, near the front, of housing 62, the air discharged therefrom will counteract this leftward movement. An air discharge nozzle 92 may be disposed on each side of housing 62. Nozzle 92 preferably includes a spring-biased cap 94, which is normally closed to prevent air from escaping through nozzle 92. Cap 94 is removed by the user exerting sufficient force to overcome the spring bias via mechanical linkage, such as a cable release mechanism 95, which includes a spring-activated release lever 97 mounted on handle 99 of the mower. Alternatively, electrical actuation means, such as a solenoid (not shown), can be used to open and close discharge nozzle 92.

Figure 7:
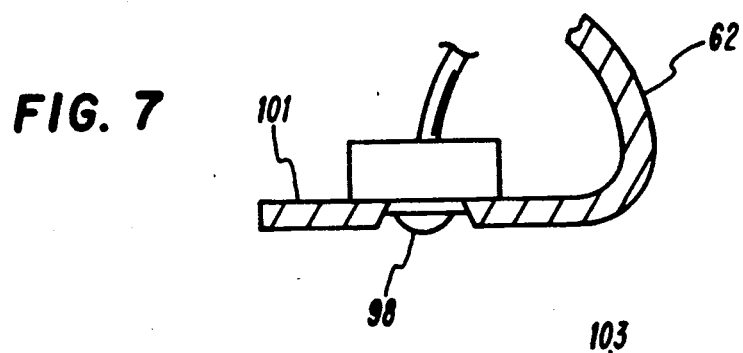
FIG. 7 is a sectional view, illustrating photodetector means for disabling the operation of a lawn mower when the lawn mower housing is tilted excessively during operation.

In another aspect of the invention, as shown in FIG. 7, photodetector means, such as a photoelectric eye 98, is positioned adjacent to the front and rear portions of lawn mower 60 for detecting the presence of light within housing 62, which will occur if housing 62 is tilted fore and aft. Photoelectric eyes 98 are preferably mounted on a relatively flat bottom plate member 101, so as to be substantially "flush" with the undersurface of plate member 101. Photoelectric eyes 98 are directed downwardly toward the ground, such that photoelectric eyes 98 are typically in a darkened condition (i.e., no appreciable amount of light is detected) when the mower housing is substantially level relative to the ground. If the housing is tilted backward, such that light penetrates the housing through the front portion thereof, the photoelectric eye 98 located adjacent to the front portion of housing 62 will detect the incoming light and in response thereto will disable the mower. Similarly, if the housing is tilted forward, the rear photoelectric eye 98 will detect incoming light and disable the mower. One or both photoeyes 98 will disable the mower if the mower is picked up or tilted on either side.

Figure 8:
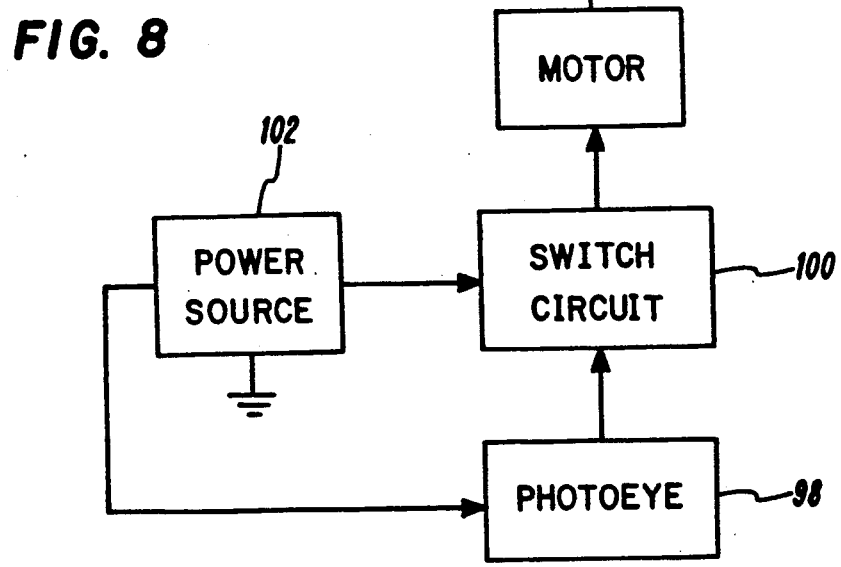
FIG. 8 is a block diagram, illustrating the means by which the mover is disable by the photodetector means.

As shown in FIG. 8, photoelectric eyes 98 control switch circuit 100 to disconnect power source 102 when light is detected, thereby disabling motor 103 or, alternatively for declutching motor 103 from the cutting blade, such that the blade is disabled without shutting off the lawn mower engine. The sensitivity of photoelectric eyes 98 must be such that the lawn mower is not disabled unless the light detected in the housing exceeds a predetermined threshold level.

In an alternate embodiment, a plurality of mercury switches (not shown) can be disposed on plate member 101 in lieu of photodetector means. One switch is positioned adjacent to a front portion of the mower housing for detecting fore and aft tilting movement of the housing and two additional switches are positioned on respective opposite sides of the housing, adjacent to a rear portion thereof, for detecting side-to-side tilting of the housing. Excessive tilting of the mower housing will open one or more of the mercury switches which disables the lawn mower (or at least the cutting blade by declutching the blade from the mower engine).

Referring to FIG. 9, yet another aspect of the invention is illustrated. First and second elongated runners 104 and 106 are mounted on respective opposite sides of bottom plate member 105 for contacting the ground during the mowing operation to enhance the stability of an air-floated lawn mower 107. Lawn mower 107 is easily moved by pressure exerted on the lawn mower handle during its operation and the operator will feel some torque resulting from the rotational force of the cutting blade. Runners 104 and 106 counteract these rotational forces by contacting the ground to cause lawn mower 107 to track in a substantially straight line during the mower process.

Runners 104 and 106 protrude downwardly from plate member 105 approximately $\frac{1}{2}$ inch and are preferably comprised of a smooth plastic material to reduce drag. Although runners 104 and 106 are illustrated as having a substantially rectangular cross-section, one skilled in the art will appreciate that runners of different shapes may also be used.

In addition to enhancing the stability of lawn mower 107, runners 104 and 106 also reduce air leakage from under plate member 105. During mower operation, plate member 105 is floated slightly above the ground, but runners 104 and 106 are in contact with the ground to block at least some of the air from escaping under plate member 105, which further enhances the lifting action on the mower housing.

Referring to FIGS. 10A and 10B, lawn mower 107 includes a single, centrally disposed runner 104, which is retractable within a slot 108 formed in plate member 105, which allows lawn mower 107 to be turned more easily. Runner 104 is pivotally mounted at one end 110 within a slot 108. Opposite end 112 of runner 104 is attached to a cable actuation mechanism 115, which is operable by the user via a lever 117 located on or adjacent to a handle 119 of mower 107. A spring member 121 biases end 112 downwardly so that at least a portion of runner 104 will contact the ground. To retract runner 104 into slot 108, the user pulls back on lever 117 to overcome the spring bias. When the user lets go of lever 117, spring member 121 will return runner 104 to its extended position Alternatively, electrical actuation means, such as a solenoid, could be used to selectively retract and extend runner 104. One skilled in the art will recognize that mechanical or electrical actuation means, as described above, can be used to retract each runner when multiple runners are used.

Figure 11:
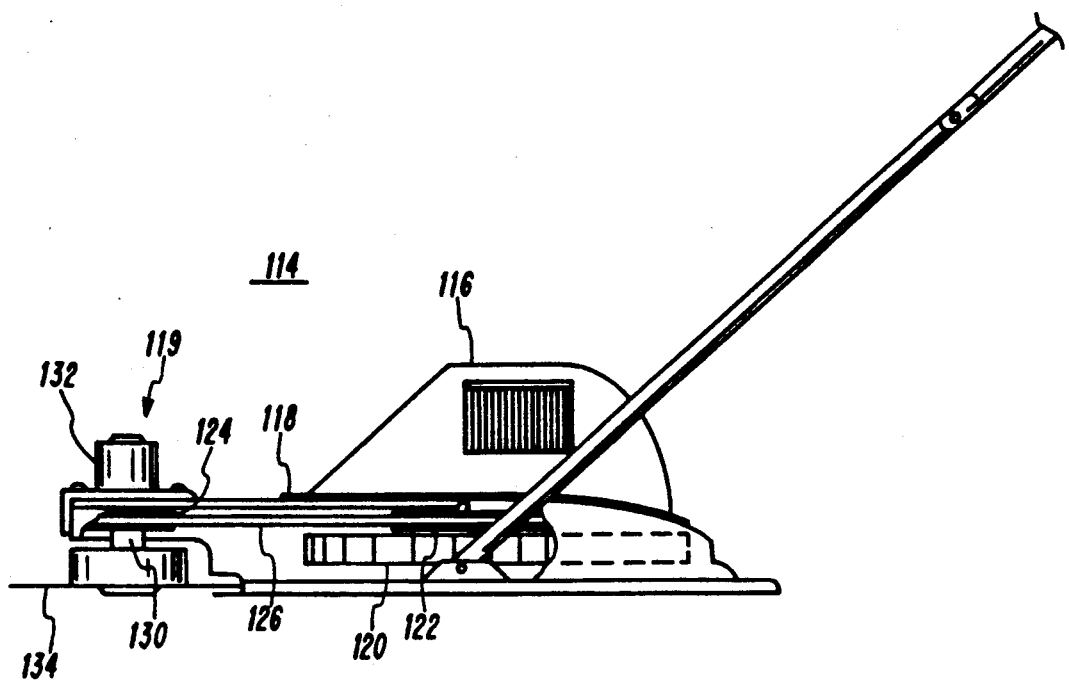
FIG. 11 is a side elevation view of an air-floated trimmer device, according to the present invention, in which a portion of the housing is cut away to show the interior components thereof.
Figure 12:
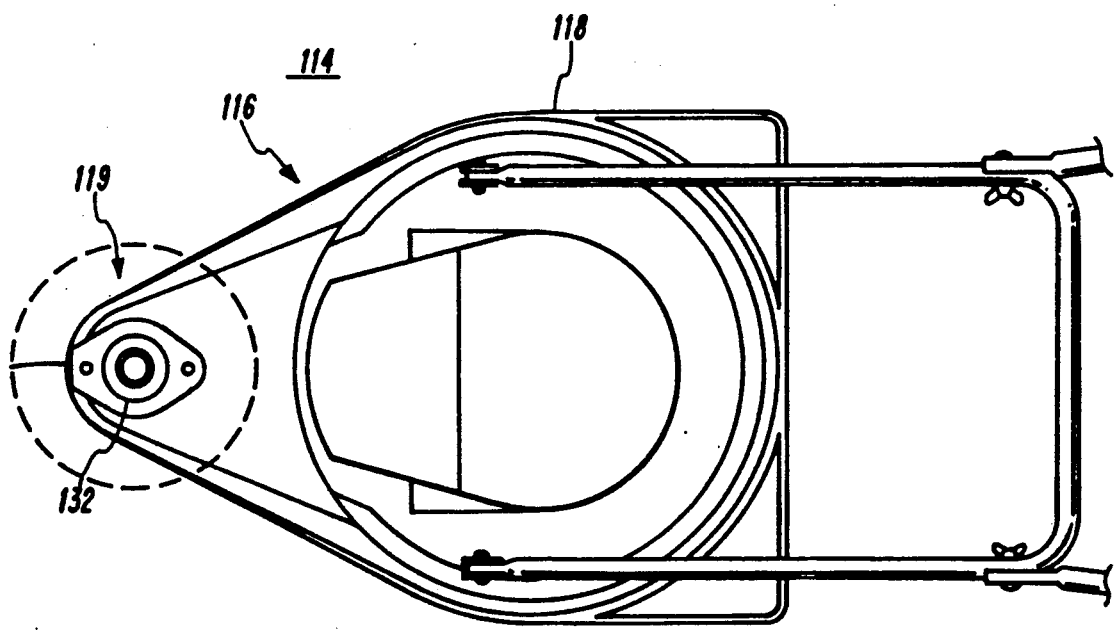
FIG. 12 is a top plan view of the air-floated trimmer of FIG. 11.

Referring to FIGS. 11 and 12, an air-floated trimmer 114 includes a housing 116 having a first portion 118 and a second portion 119, laterally disposed with respect to first portion 118. Air impeller 120 is mounted for rotation within first portion 118 and a bottom plate member (not shown) is disposed in first portion 118 to enhance the lifting action on housing 116, as previously described. The cutting unit, which includes a flexible cutting member for cutting vegetation and the like along a border thereof, is mounted in second portion 119.

A first pulley 122 is mounted for common rotation with air impeller 120 and is connected to a second pulley 124 in second portion 119 by means of a belt 126. A power source, such as an AC or DC electric motor, rotates first pulley 122 and air impeller 120. The rotary motion of air impeller 120 draws air into housing 116 to create air pressure therein sufficient to float housing 116, including second portion 119, above the ground. The rotary motion of first pulley 122 is transmitted via belt 126 to second pulley 124.

The cutting unit includes a shaft 130, which is rotatably connected to second pulley 124 for being rotated thereby, a trimmer head 132 and a cutting element 134, which may be a flexible line or blade(s). The rotary motion of second pulley 124 rotates shaft 130, which in turn rotates cutting element 134 to effect the cutting action. In this manner, the cutting unit is supported above the ground by the floating action of housing 116, which substantially facilitates proper positioning and handling of the trimmer because the user is relieved of the burden of keeping the trimmer elevated. By positioning the trimmer elements in an extended portion of the housing, the trimmer can be used around shrubbery and the like without stirring up excessive dirt and debris because the trimmer elements are spaced apart laterally from the portion of the housing in which air pressure is generated and from which any escaping air may stir up dirt and debris. Cutting element 134 is adjustable vertically to select the depth of cut by conventional means.

Figure 13:
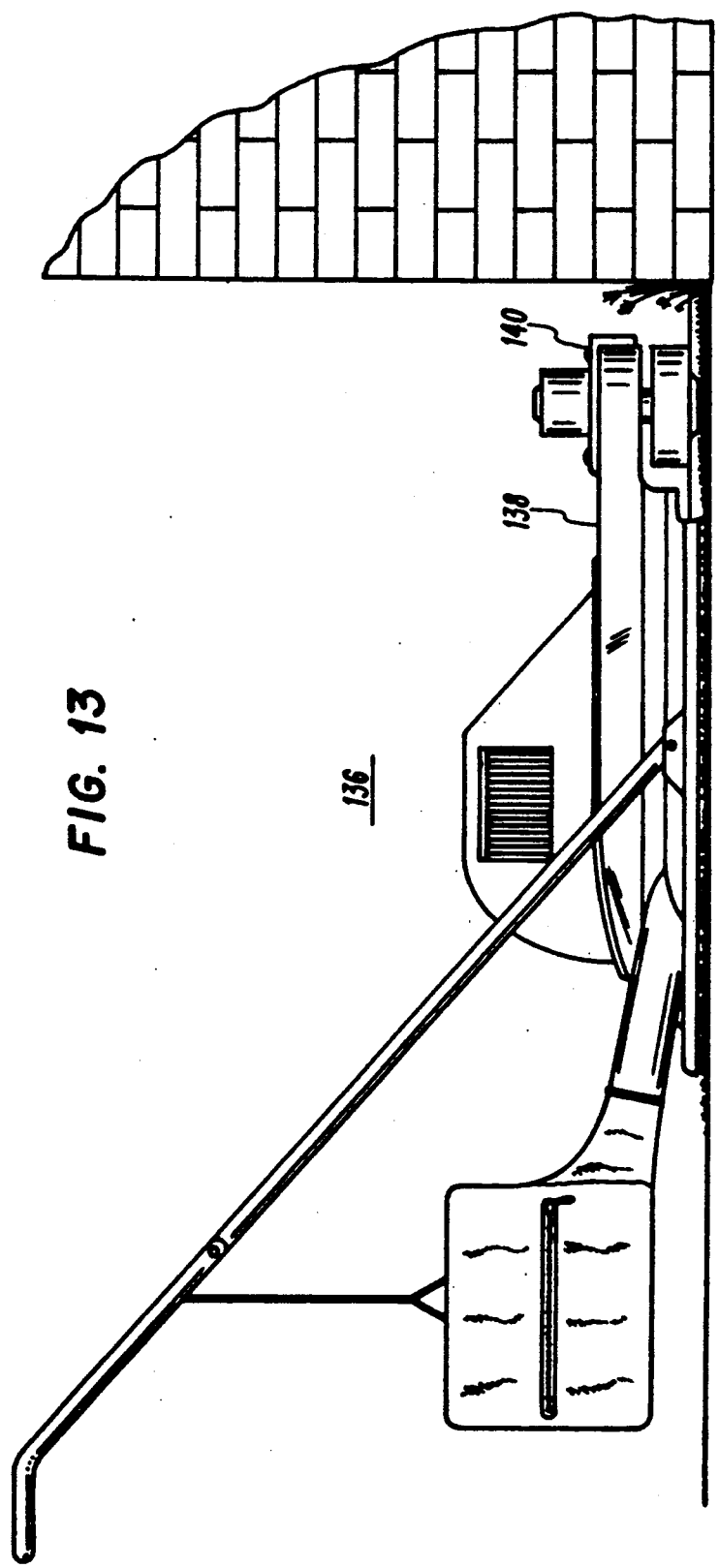
FIG. 13 is a side elevation view of a combination air-floated mower and trimmer, according to the present invention.

Referring to FIG. 13, a combination air-floated lawn mower and trimmer 136 is illustrated. The lawn mower elements, including an air impeller, cutting blade and glide plate are disposed within a first portion 138 of the housing in substantially the same manner as described above with reference to FIGS. 1 and 2. The trimmer elements are disposed within a second portion 140 of the housing, laterally disposed with respect to first portion 138, in substantially the same manner as described above with reference to FIGS. 11 and 12. By positioning the trimmer elements in second portion 140, the effective cutting range of combination mower and trimmer 136 is substantially increased.

Figure 14:
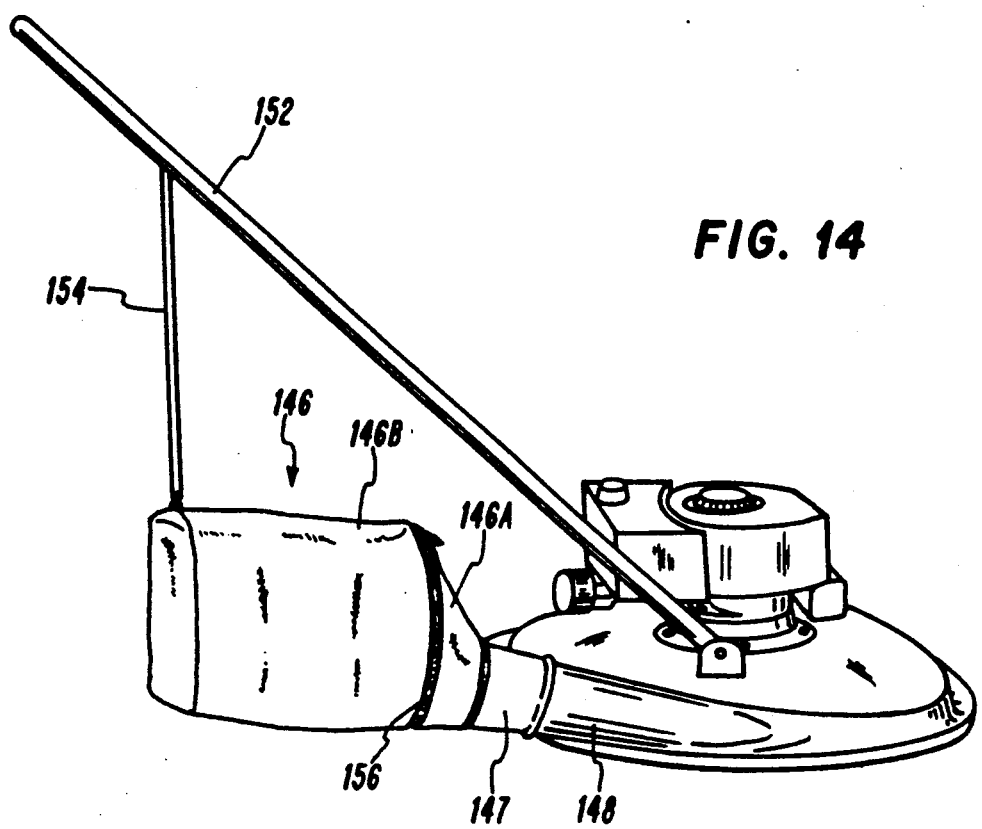
FIG. 14 is a perspective view of a grass collection receptacle installed on a lawn mower, according to the present invention.
Figure 15:
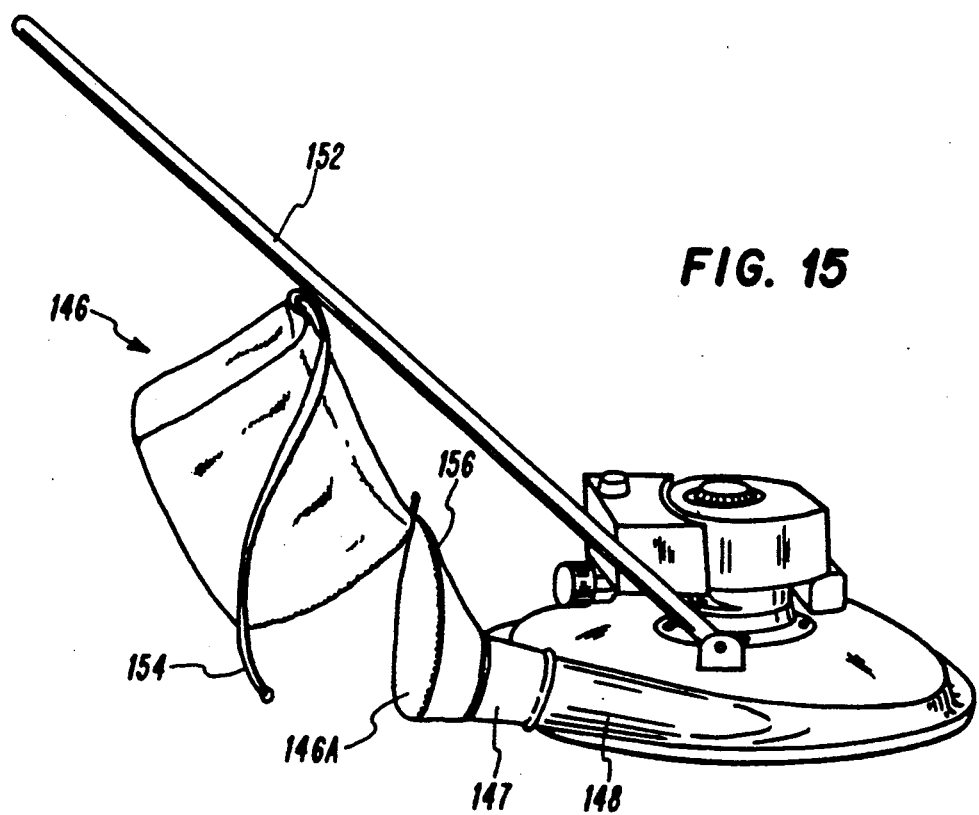
FIG. 15 is a perspective view of the grass-collection receptacle of FIG. 14, showing the grass-collection receptacle in an open position for dumping the contents thereof.

Referring to FIGS. 14 and 15, a grass-collection receptacle 146 is preferably comprised of a waterproof, double field polyester No. 10 duck material. Receptacle 146 is expandable by air being discharged through duct 148, but yet is sufficiently porous to allow the air to pass through the material so that substantial back pressure is not created in duct 148. The expansion of receptacle 146 increases the grass-catching capacity thereof and also facilitates the discharge of grass cuttings into receptacle 146 through duct 148.

Receptacle 146 has an open mouthed sleeve portion 147, which fits over discharge duct 148 and is preferably secured tightly thereto by an O-ring or the like sewn into the open mouth of sleeve 147. Receptacle 146 can be disengaged from duct 148 by stretching the O-ring to remove sleeve portion 147. The rear portion of receptacle 146 is hung from handle 152 by means of an attachment strap 154 or the like. Receptacle 146 is comprised of a front portion 146A and a rear portion 146B, which are connected by means of a zipper 156. Zipper 156 extends around most of the circumference of receptacle 146, but terminates short of a complete rotation, such that front and rear portions 146A and 146B are substantially permanently joined along a small portion between the respective opposite ends of zipper 156. Rear portion 146B can be disengaged from handle 152 and lifted upwardly to dump the contents from receptacle 146 when zipper 156 is opened. The unzippered portion therefore acts as a hinge connecting front and rear portions 146A and 146B when zipper 156 is opened. Strap 154 may be removed from handle 152, as shown in FIG. 15.

Figure 16:
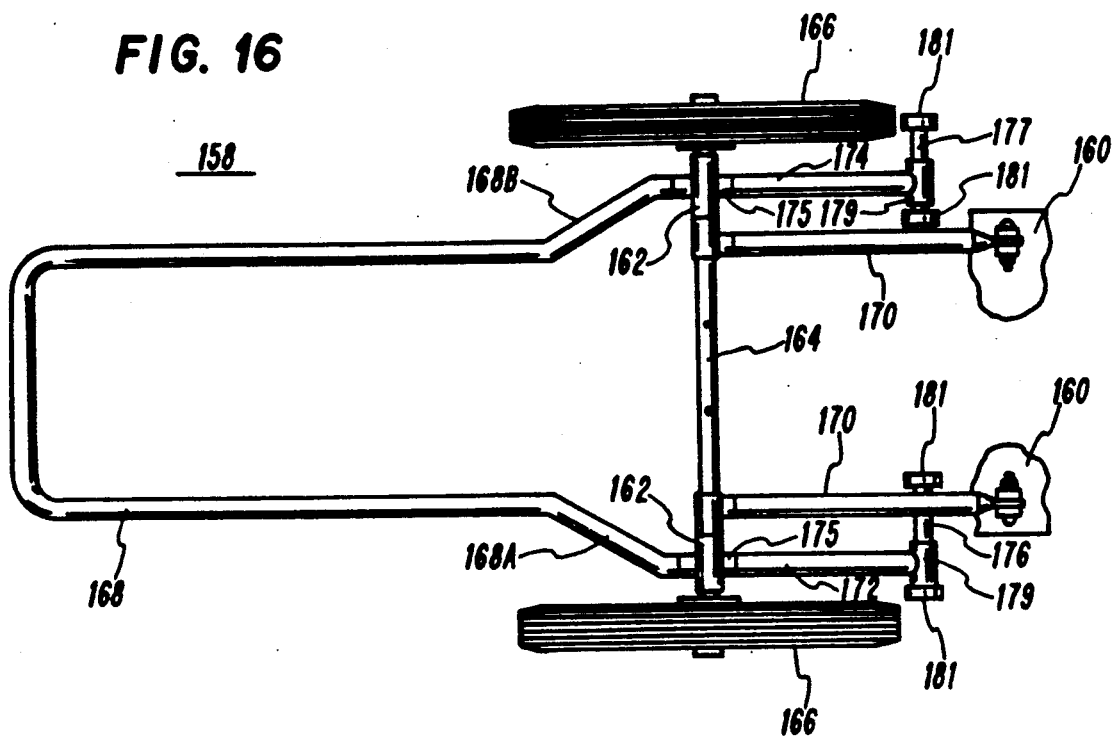
FIG. 16 is a front elevation view of a frame assembly for a lawn mower, according to the present invention.

Referring to FIG. 16, a frame assembly 158 for an air-floated lawn mower includes an axle 164 connecting a pair of wheels 166. A substantially U-shaped handle 168 is attached by welding or the like to sleeves 162, such that handle 168 can pivot with respect to axle 164. First and second pivot arms 170 are pivotally attached to axle 164 inside of the pivotal attachments of handle 168 on axle 164 at respective first ends thereof and are pivotally attached to housing 160 at respective second ends thereof, such that housing 160 is moveable independently of wheels 166 and axle 164.

Two spaced apart members 172 and 174 extend from axle 164 toward housing 160 and are coupled to respective arms 168A and 168B of handle 168 via sleeves 175. The respective ends of spaced apart members 172 and 174 which are farthest from axle 164 have respective right angle extensions 176 and 177 located beneath a corresponding one of pivot arms 170, such that pivot arms 170 will be raised by the upward movement of spaced apart members 172 and 174 when handle 168 is lowered, thereby raising housing 160. With housing 160 in a raised position, the movement of the lawn mower is substantially facilitated when the mower is not in operation.

Right angle extensions 176 and 177 are preferably comprised of respective shaft members, which are axially movable within corresponding sleeves 179 disposed on the ends of spaced apart members 172 and 174. Cap members 181 are disposed on respective opposite ends of each shaft member for limiting the axial movement thereof within the corresponding sleeves 179. Thus, shaft members 176 and 177 can be selectively engaged with and disengaged from corresponding pivot arms 170. When the lawn mower is in operation, shaft members 176 and 177 are moved axially outward from pivot arms 170, such that handle 168 is movable independently of pivot arms 170. Alternatively, when the mower is not in operation and it is desired to lift housing 160 above the ground, shaft members 176 and 177 are slid axially inward so that respective portions of shaft members 176 and 177 are positioned beneath corresponding pivot arms 170, whereby the downward movement of handle 168 will lift pivot arms 170 and housing 160.

Figure 17A:
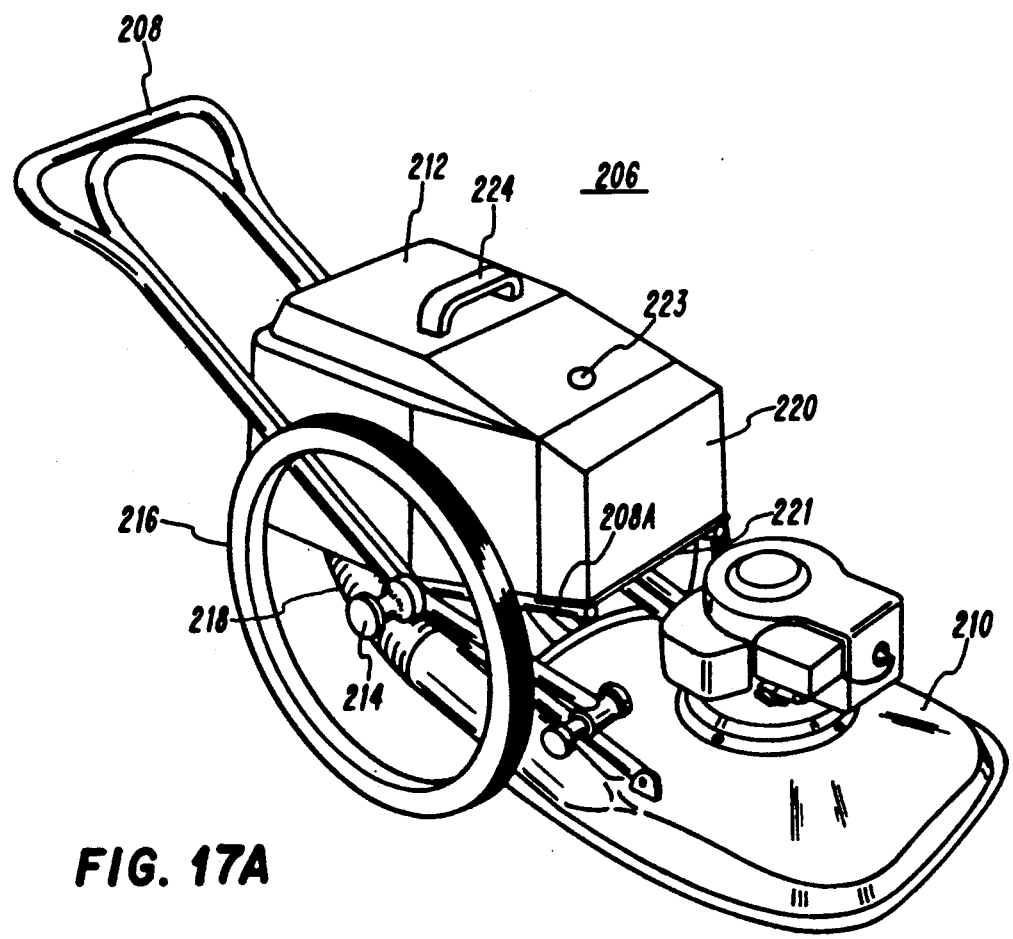
FIGS. 17A–17C are various views of an alternate embodiment of a grass-collection receptacle, according to the present invention.
Figure 17B:
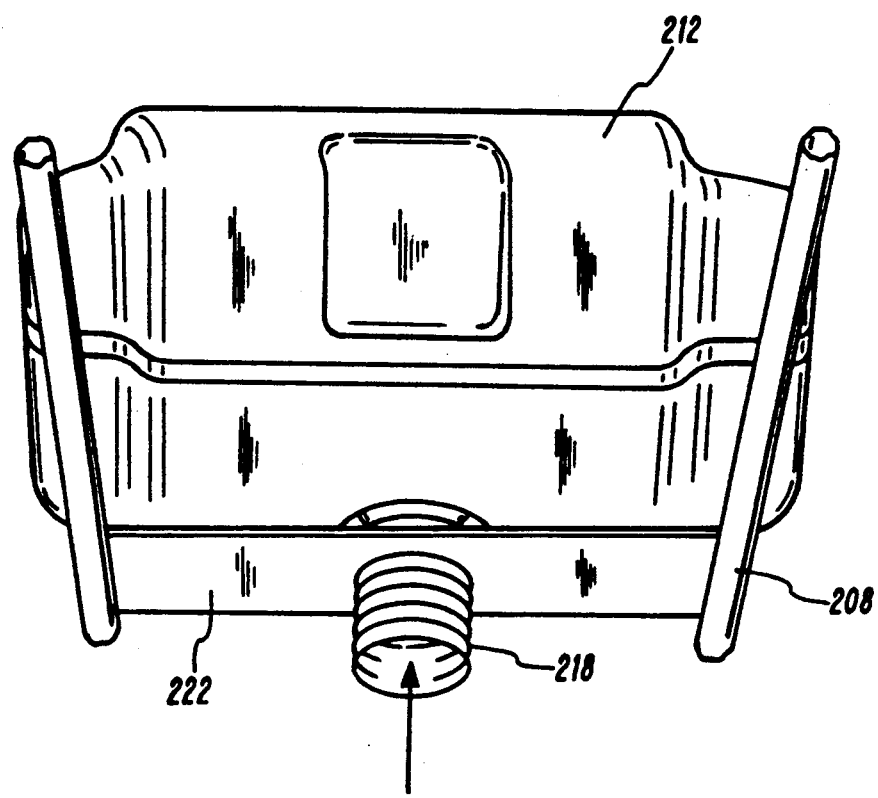
Figure 17C:
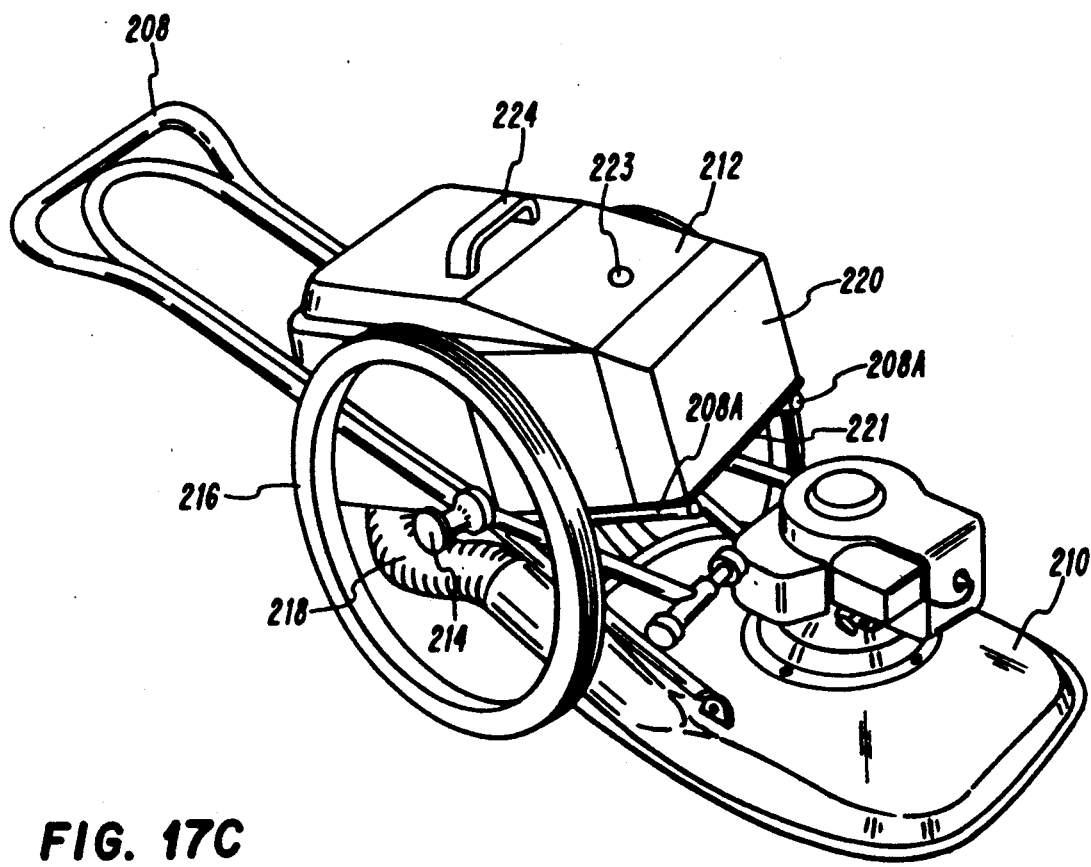

Referring to FIGS. 17A-17C, lawn mower 206 includes a handle 208, housing 210 and a grass-collection receptacle 212, which is pivotally mounted on an axle 214. A pair of wheels 216 are positioned on respective opposite ends of axle 214 for supporting receptacle 212; such that the center-of-gravity of receptacle 212 is substantially above axle 214. Housing 208 includes a rearwardly extending duct 218 for discharging grass cuttings at a rear portion of receptacle 212, as best seen in FIG. 17B. Receptacle 212 is disposed above handle 208 to facilitate removal of receptacle 212 for dumping.

Receptacle 212 is preferably comprised of a lightweight injection molded plastic material having an open mouth facing in the direction of housing 210. A cover member 220 is mounted on a base plate 221, which is affixed to an extension portion 208A of handle 208 for closing off the open mouth of receptacle 212. A support plate 222 is mounted on handle 208 for supporting the rear portion of receptacle 212, such that receptacle 212 is tilted slightly forward when receptacle 212 is mounted on lawn mower 206. The slight forward tilt of receptacle 212 enhances the collection of grass cuttings within receptacle 212 because grass cuttings discharged into the rear portion of receptacle 212 will tend to fall by gravity toward a forward portion thereof. A handle 224 is positioned on top of receptacle 212 for being grasped by a user.

As best seen in FIG. 17C, receptacle 212 is removed from lawn mower 206 by rotating handle 208 downwardly, such that receptacle 212 will pivot around axle 214 to a position at which a front end of receptacle 212 is tilted upwardly at an angle of approximately thirty degrees to prevent the spillage of grass through the open mouth thereof. Receptacle 212 can then be removed for dumping.

In an alternate embodiment photodetector means (not shown) can be positioned inside receptacle 212 to determine when receptacle 212 is full. When no light is detected by the photodetector means, this indicates that receptacle 212 is substantially full. An electrical signal is generated, which illuminates light bulb 223 located on top of receptacle 212, thereby alerting the operator to dump the contents of receptacle 212.

Figure 18:
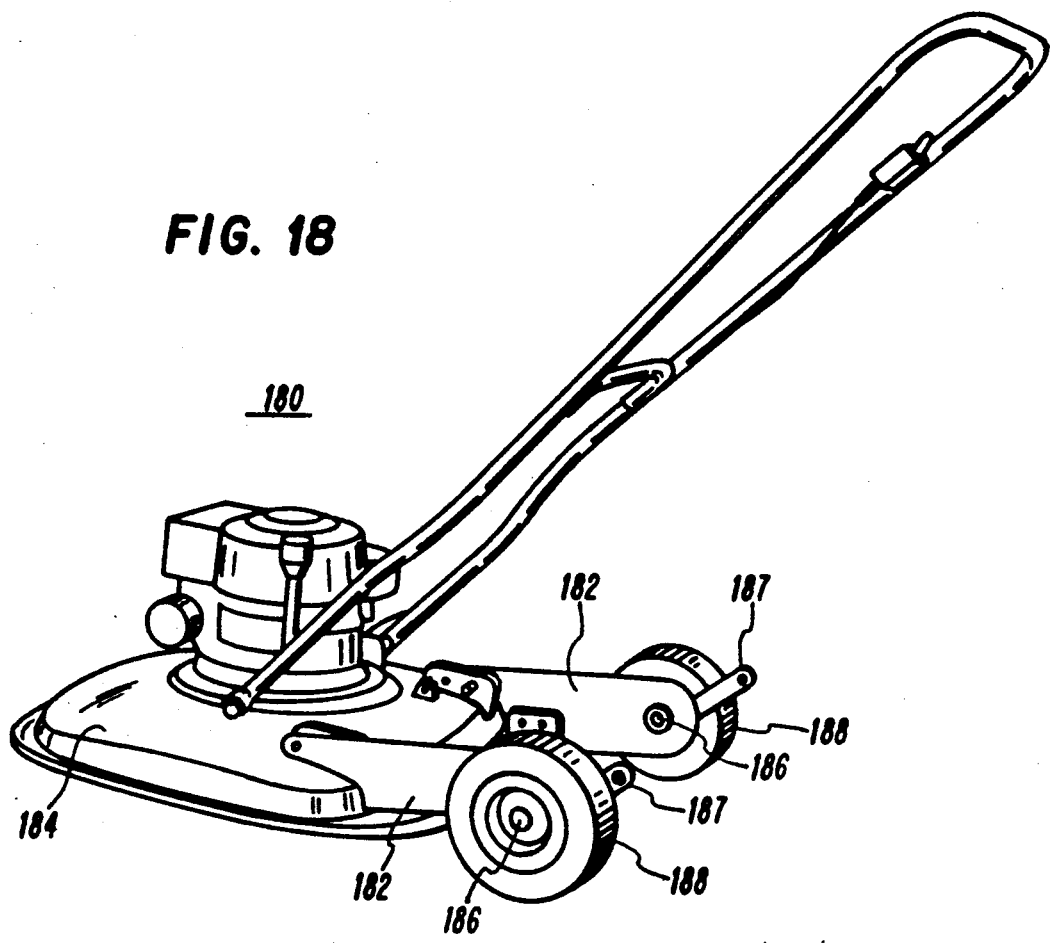
FIG. 18 is a perspective view of yet another alternate embodiment of an air-floated lawn mower, according to the present invention.

Referring to FIG. 18, an air-floated lawn mower 180 has first and second attachment members 182, which are coupled to housing 184 at respective first ends thereof and to an axle 186 at respective second ends thereof. First and second wheels 188 are mounted on axle 186 outboard of attachment members 182. Attachment members 182 are mounted on housing 184 and on axle 186, such that housing 184 is able to float up and down with respect to axle 186 and wheels 188. Wheels 188 provide stability for mower 180 and also support a grass-collection receptacle (not shown), which may be mounted on axle 186. In order to achieve a level cut, the height of wheels 188 should be adjusted, such that attachment members 182 and housing 184 are substantially level when housing 184 is in an operating position (i.e., floated slightly above ground).

Figure 19:
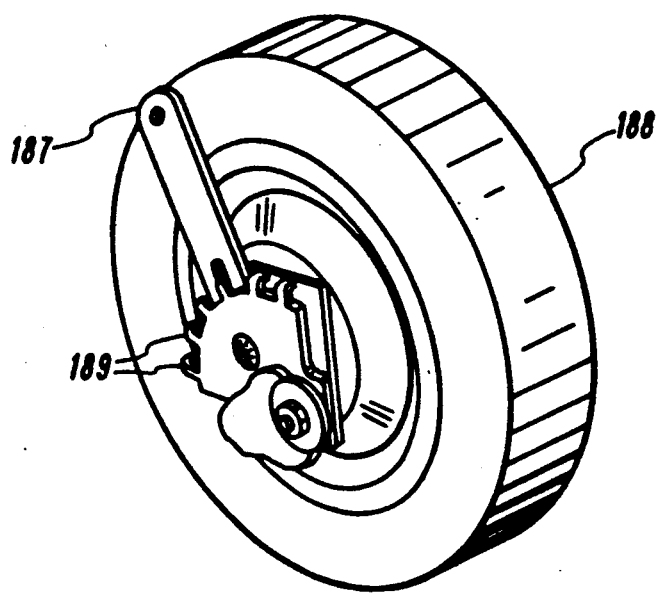
FIG. 19 is an elevation view, illustrating the mechanism for adjusting the wheel height of the lawn mower of FIG. 18.

As shown in FIG. 19, a conventional height adjustment mechanism 190 is disposed on each attachment member 182 for adjusting the position of wheels 188 relative to the corresponding second ends of attachment members 182. To adjust the position of wheels 188, mower 180 is placed on a hard flat surface, such as a sidewalk or concrete driveway, and is operated, so that housing 184 floats above the support surface. Wheels 188 are then adjusted up or down with respect to the respective second ends of members 182 by positioning lever 187 in engagement with the appropriate detent 189. When wheels 188 are properly adjusted, attachment members 182 are substantially level. By adjusting the position of wheels 188 to maintain housing 184 substantially level, a more even cut is obtained with lawn mower 180.

Figure 20:
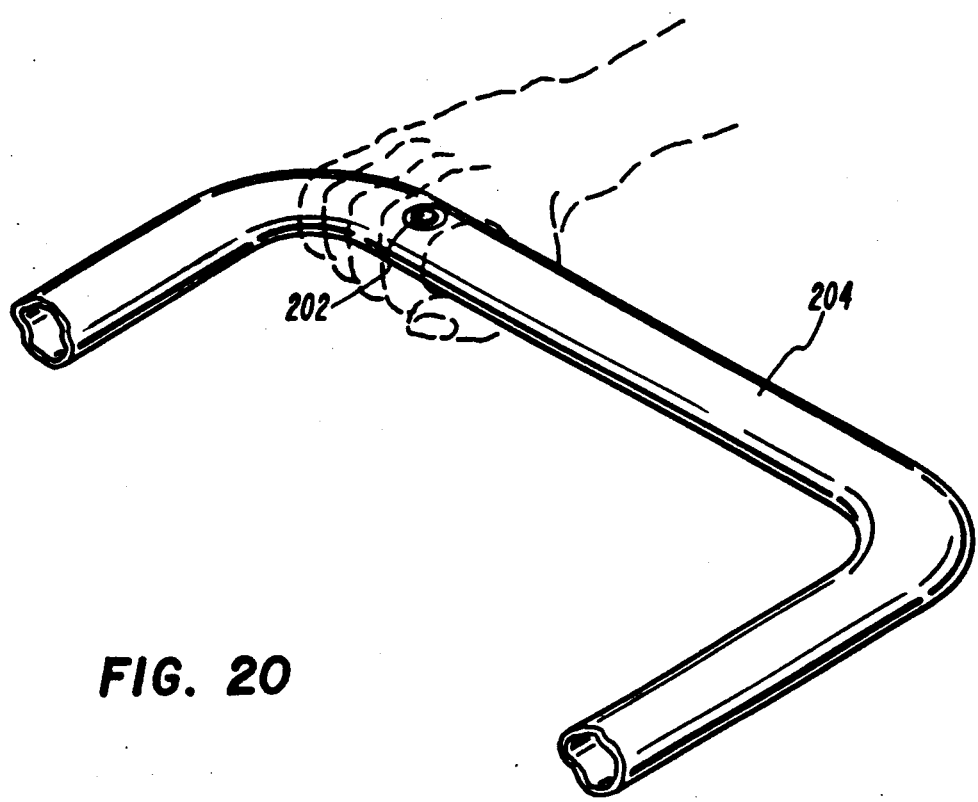
FIG. 20 is a perspective view of a portion of a lawn mower handle having photodetector means mounted thereon for automatically disabling the operation of the mower.

Referring to FIG. 20, a photoelectric eye 202 is mounted in handle 204 of a lawn mower. Eye 202 is positioned for detecting light rearwardly of its mounted position on handle 204. During operation of the mower, the user's hand will cover photoelectric eye 202 so that eye 202 is in a darkened condition. Eye 202 controls an electronic switching circuit, such as that illustrated in FIG. 8, for disabling the lawn mower (or, alternatively, for declutching the cutting blade from the mower engine) when eye 202 detects light, such as when the user removes his hand from handle 204.

AIR-FLOATED VACUUM CLEANER

Figure 21:
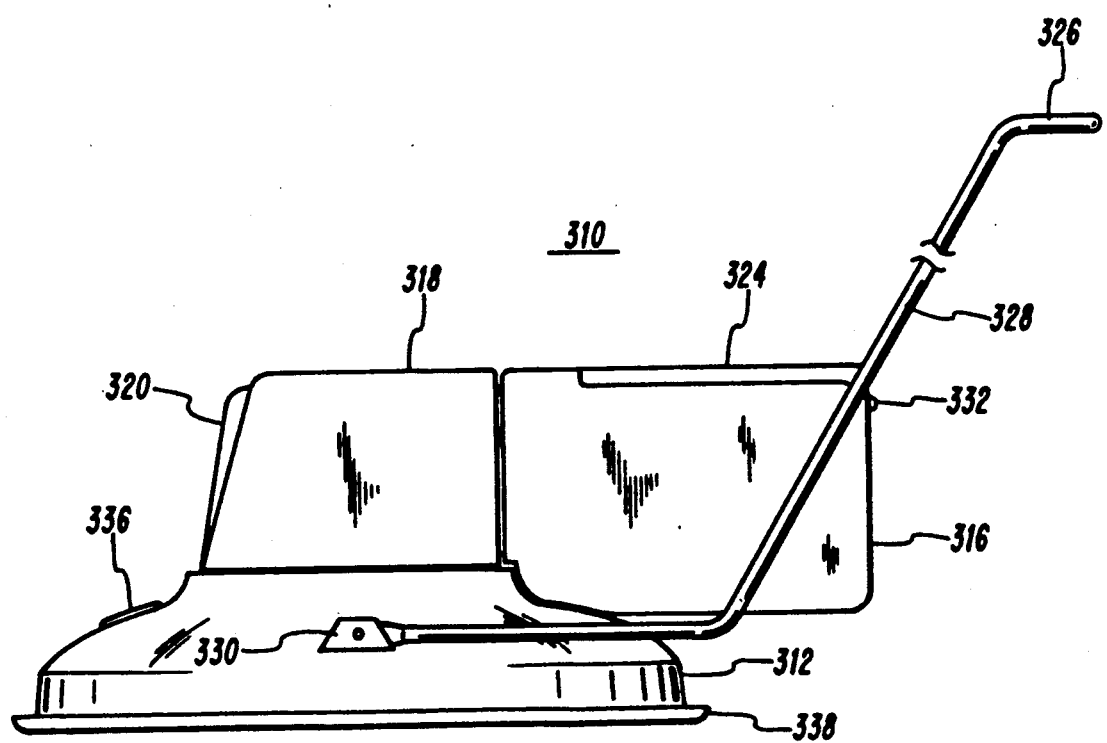
FIG. 21 is a left side elevation view of an air-floated vacuum cleaner, according to the present invention.

Referring specifically to FIGS. 21, 23 and 24, an air-floated vacuum cleaner 310 is comprised of an exterior deck housing 312, a power source such as an electric motor 314 and an exterior molded receptacle 316 for collecting dust and debris discharged from housing 312, as will be described in greater detail hereinafter. Electric motor 314 is operatively mounted on top of housing 312 in a conventional manner. Motor 314 is received within a casing 318, which is also mounted on top of housing 312. Casing 318 includes a louvre 320 to provide ventilation for motor 314.

Receptacle 316 is attached to a back portion of casing 318. Receptacle 316 is adapted for receiving a disposable bag 322, wherein dust and debris picked up by vacuum cleaner 10 are collected. Receptacle 316 further includes a hinged lid 324, which can be opened to get access to bag 322. A handle 326 having two depending arms 328 is pivotally attached to housing 312 by means of brackets 330. The hinge mechanism (not shown) which maintains lid 324 in closed position is released by means of a conventional push button release mechanism 332, which is disposed on a back surface of receptacle 316. Handle 326 preferably includes a push button ON/OFF switch 334 for controlling the operation of vacuum cleaner 310.

Housing 312 has a plurality of air inlet openings 336, one of which is shown in FIG. 21. The bottom part of housing 312 is defined by an upturned peripheral lip member 338. Housing 312 is preferably an endless housing and in one embodiment has a substantially rectangular shape with rounded corners. In an alternate embodiment (not shown) housing 312 can be configured with a substantially circular shape.

Figure 22:
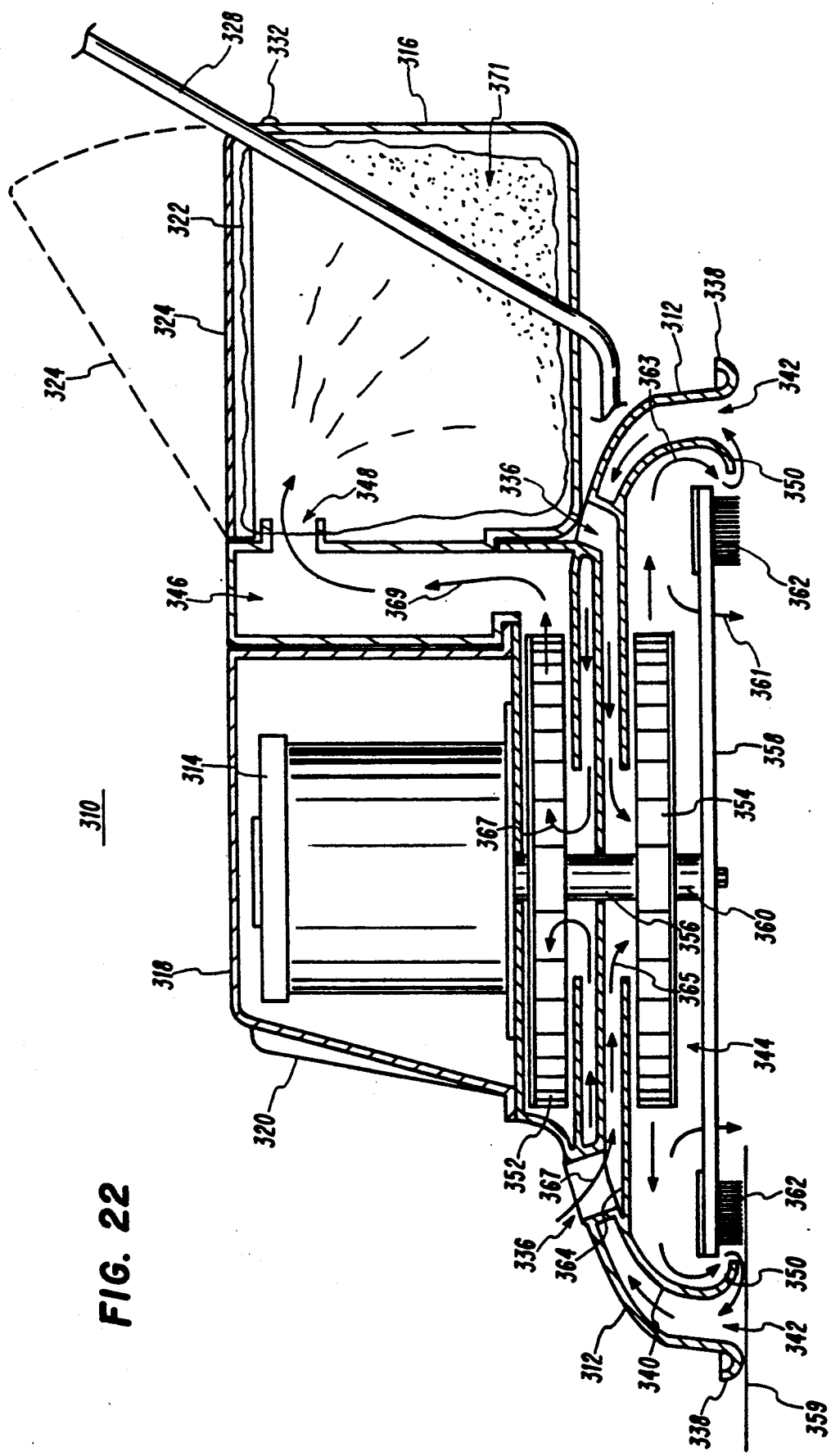
FIG. 22 is a sectional view of the vacuum cleaner of FIG. 21.
Figure 25:
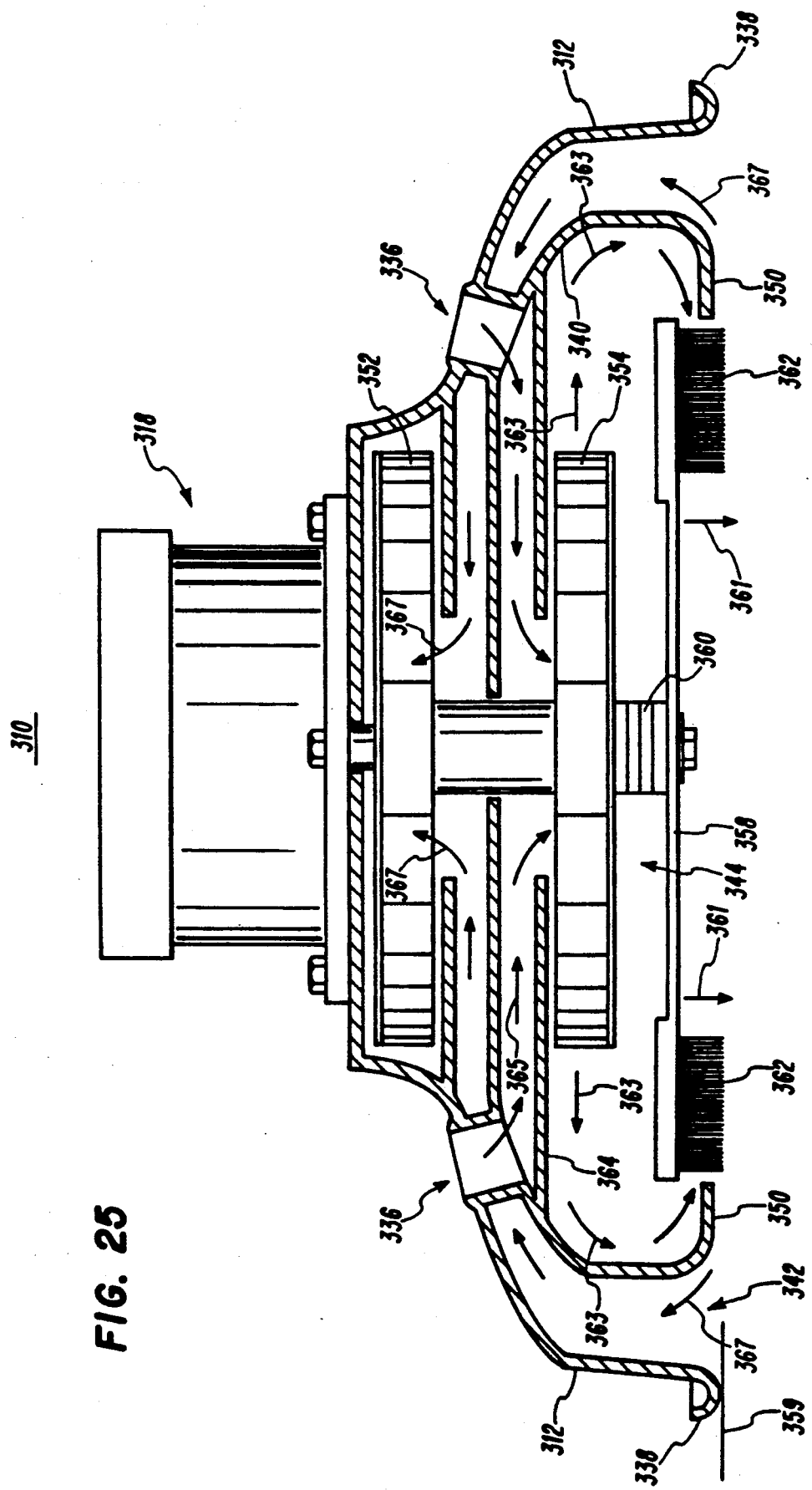
FIG. 25 is a sectional view of a housing portion of the vacuum cleaner of FIG. 21.
Figure 26:
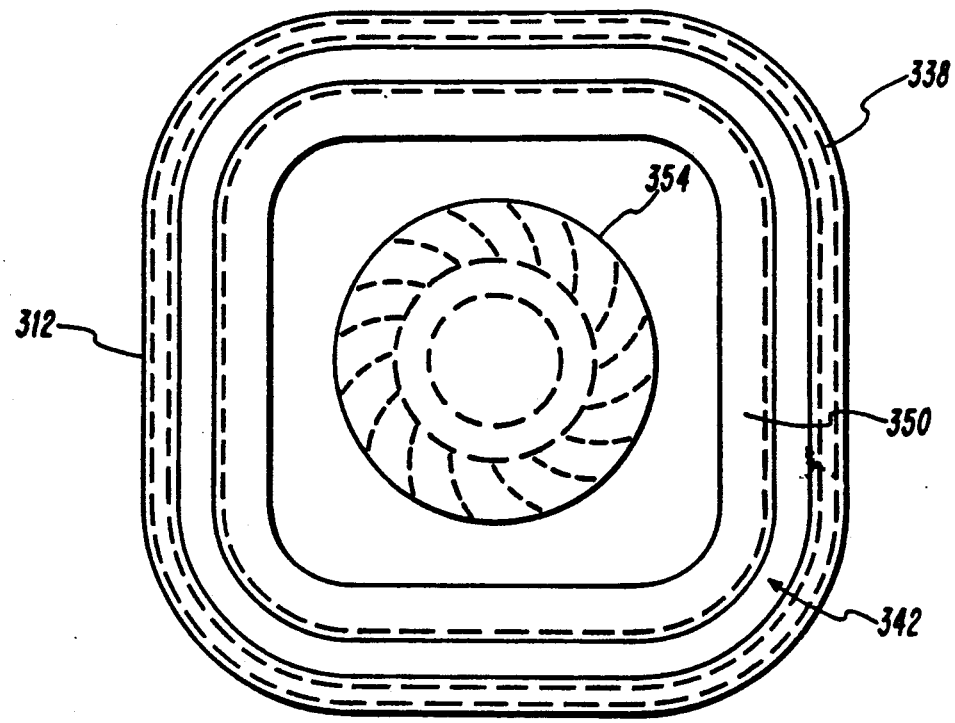
FIG. 26 is a bottom plan view of the housing portion of the vacuum cleaner of FIG. 21.

The components inside of housing 312 are depicted in detail in FIGS. 22, 25 and 26. An endless shroud 340 is disposed inside of housing 312 to define a first air chamber 342 between housing 312 and shroud 340 and a second air chamber 344 inside of shroud 340. First air chamber 342 substantially completely surrounds shroud 340 and communicates with a passageway 346 leading to receptacle 316 via open mouth 348 of receptacle 316. First chamber 342 defines a substantially ring-shaped chamber through which dust and debris sucked up by vacuum cleaner 310 are exhausted into receptacle 316, as will be described in greater detail hereinafter.

Shroud 340 terminates at a bottom part thereof in a relatively flat shelf or plate 350, which projects into second chamber 344. Plate 350 projects into second chamber 344 from around substantially the entire bottom part of shroud 340, such that plate 350 defines a substantially 360° shelf around the bottom part of shroud 340, as best seen in FIG. 26. A first air impeller 352 is located within first chamber 342 for exhausting air and the dust and debris from first chamber 342 into passageway 346. A second air impeller 354 is located within second chamber 344 for pressurizing the air introduced into second chamber 344 via inlet opening 336. First and second air impellers 352 and 354 are mounted for co-rotation with shaft 356 of motor 314. A flexible blade member 358 is also mounted for co-rotation with shaft 356, below first and second air impellers 352 and 354. Spacers 360 are positioned between second air impeller 354 and blade member 358 to adjust the position of blade member 358 vertically. Blade member 358 has a plurality of flexible bristles 362 at each end thereof for contacting a surface 359, such as a floor or carpet, beneath shroud 340 for agitating dust and debris on surface 359 when blade member 358 is rotated during the operation of vacuum cleaner 310. The arrows indicate the flow of air within housing 312 and shroud 340.

Air is introduced through inlet openings 336 directly into second chamber 344. A relatively flat platform 364 having a central opening channels the air to the suction side of second air impeller 354, as indicated at 365. Second air impeller 354 discharges the air under pressure by centrifugal force outwardly toward shroud 340, as indicated by arrows 363. The air will follow the path of least resistance downwardly along shroud 340 until the air is acted upon by plate 350, which directs the air flow inwardly within second chamber 344. As the air flows downwardly and inwardly within second chamber 344, the air will contact the surface beneath shroud 340 to provide a ground effect, as indicated by arrows 361 whereby the entire housing 312 and shroud 340 are lifted slightly above support surface 359. At least some of the air will escape from second chamber 344 beneath plate 350 and the escaping air acting on an undersurface of plate 350 will further enhance the lifting action imparted to housing 312 and shroud 340.

The rotary action of blade member 358 will stir up dust and debris from support surface 59 along the path of air escaping from second chamber 344, such that the dust and debris will be carried by the escaping air from second chamber 344 (which functions as a pressure chamber) into first chamber 342 (which functions as a vacuum chamber). The escaping air will also "aerate" support surface 359 to further enhance the removal of dust and debris therefrom. Although some of the air will escape from housing 312 underneath lip member 338, the suction action created by the rotation of first air impeller 352 will provide a path of least resistance for the escaping air within first chamber 42. First air impeller 352 sucks air and dust and debris upwardly through first chamber 342, as indicated at 367, and discharges the air and dust and debris under pressure into passageway 346, as indicated at 369, and thence through open mouth 348 into receptacle 316, where the dust and debris are collected, as indicated at 371. One skilled in the art will appreciate that a relatively constant air flow is established within housing 312 and shroud 340 and that the same air which is used to pressurize second chamber 344 and lift housing 312 and shroud 340 above support surface 359 is also used as vacuum air to suck dust and debris into receptacle 316.

The flexibility of blade member 358 allows bristles 362 to follow the contours of support surface 359 and also provides a self-adjusting feature while vacuum cleaner 310 is in operation. The relatively flat plate 350 not only enhances the lifting force imparted to housing 312 and shroud 340, but also enhances the stability and handling characteristics of vacuum cleaner 310 by substantially preventing vacuum cleaner 310 from wobbling and meandering during operation. Plate 350 also functions as a seal to capture air within second chamber 344 and inhibit the escape of air from beneath lip member 338.

Figure 27:
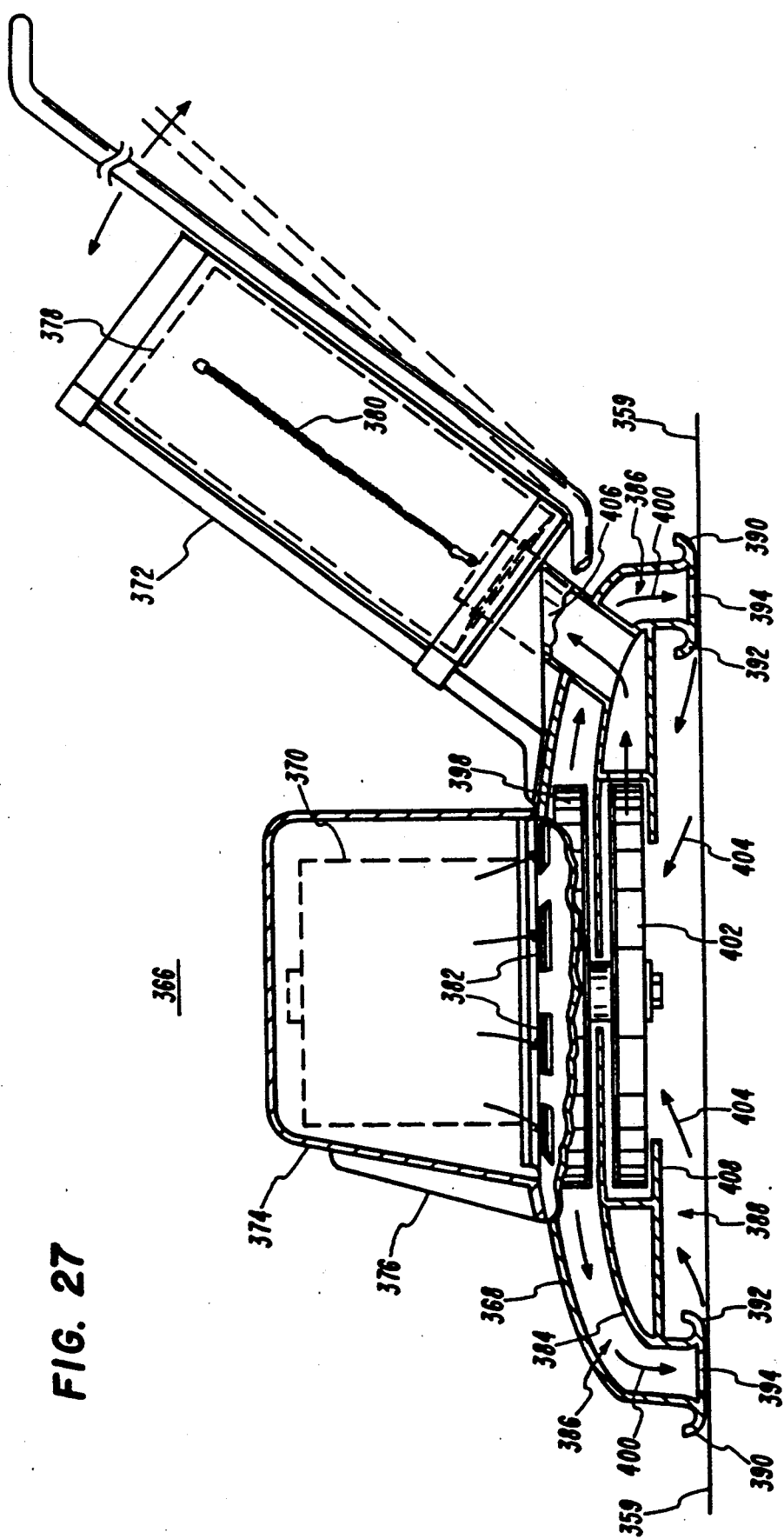
FIG. 27 is a sectional view of an alternate embodiment of an air-floated vacuum cleaner, according to the present invention.
Figure 28:
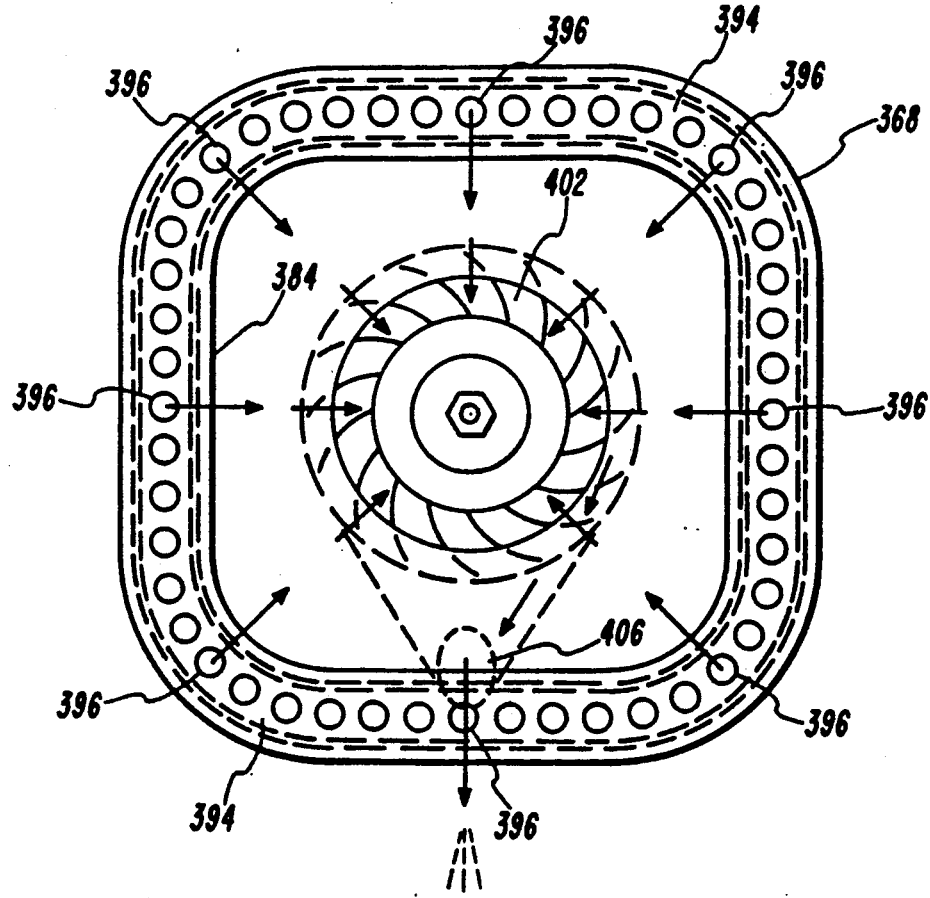
FIG. 28 is a bottom plan view of the vacuum cleaner of FIG. 27.

Referring to FIGS. 27 and 28, an alternate embodiment of an air-floated vacuum cleaner 366 is depicted. Vacuum cleaner 366 is comprised of an exterior deck housing 368, a power source such as an electric motor 370 and an exterior molded receptacle 372 for collecting dust and debris discharged from housing 368. Motor 370 is received within a casing 374, which is mounted on top of housing 368. Casing 374 includes a louvre 376 to provide ventilation for motor 370.

Receptacle 372 is attached to a back portion of casing 374 and is adapted for receiving a disposable bag 378, wherein dust and debris picked up by vacuum cleaner 366 are collected. One side of receptacle 372 is zippered, as indicated at 380, to facilitate access to bag 378.

Housing 368 has a plurality of air inlet openings 382 for introducing air into housing 368. An endless shroud 384 is disposed inside of housing 368 to define a first air chamber 386 between housing 368 and shroud 384 and a second air chamber 388 inside of shroud 384. First air chamber 386 substantially completely surrounds shroud 384, such that first chamber 386 defines a substantially ring-shaped chamber. Both housing 368 and shroud 384 terminate at respective upturned lip members 390 and 392. Lip member 390 is external to housing 368, while lip member 392 is internal to shroud 384, as best seen in FIG. 27. A relatively flat plate member 394 extends from a bottom part of shroud 384 to a corresponding bottom part of housing 368, around substantially the entire outer bottom part of shroud 384. As best seen in FIG. 28, plate member 394 has a plurality of apertures 396 at spaced intervals around the plate member 394 to allow communication between first and second air chambers 386 and 388.

A first air impeller 398 is located within first chamber 386 for receiving suction air through air openings 382 and for discharging the air under pressure into first air chamber 386, such that first air chamber 386 defines a pressure chamber. The rotary action of first air impeller 398 will direct pressurized air outwardly and downwardly within first chamber 386, as indicated by arrows 400. At least some of the air will flow downwardly through apertures 396 and will escape into second chamber 388. A second air impeller 402 is located in second chamber 388 for receiving suction air escaping from first air chamber 386 into second air chamber 388, as indicated by arrows 404, and for exhausting the air under pressure through a discharge port 406 into bag 378 within receptacle 372. First and second air impellers 398 and 402 are preferably mounted for co-rotation within housing 368.

A relatively flat platform 408 is disposed beneath second air impeller 402 for directing the suction air flow within second chamber 388 substantially radially inward toward second air impeller 402, as best seen in FIG. 28. Second air chamber 388 functions as a vacuum chamber, such that the suction action provided by second air impeller 402 will draw air escaping through apertures 396 into second chamber 388, thereby inhibiting the escape of air from housing 368 beneath external lip member 390. Air flowing through apertures 396 will build up air pressure between an undersurface of plate 394 and a support surface 359, such as a floor or carpet, to create a ground effect for lifting housing 368 and shroud 384 slightly above the support surface 359. Although not shown in FIG. 27, one skilled in the art will appreciate that a flexible blade member, similar to the blade member 358, described above with reference to FIGS. 22 and 25, is preferably located in housing 368, such that the rotary action of the flexible blade member will stir up dust and debris from the support surface 359 and the air escaping from first chamber 386 into second chamber 388 will carry the dust and debris upwardly within second chamber 388 and through discharge port 406 into collection bag 378. The escaping air will "aerate" support surface 359 to enhance the removal of dust and debris therefrom.

The air-floated vacuum cleaner according to the present invention has many advantages over prior air wheel-supported vacuum cleaners. By eliminating the support wheels, the air-floated vacuum cleaner can be moved in any direction or along any arc between 0° and 360° and is not limited to the fore and aft movements of conventional vacuum cleaners. Furthermore, the vacuuming action takes place around the entire perimeter of the vacuum cleaner housing (360°) and is not limited to a relatively narrow area at the front of the vacuum cleaner housing, as in conventional cleaners.

Various embodiments of the invention have now been described in detail. Since it is obvious that many changes in and additions to the above-described preferred embodiment may be made without departing from the nature, spirit and scope of the invention, the invention is not to be limited to said details, except as set forth in the appended claims.

What is claimed is:

1. An apparatus, comprising, in combination:
   a substantially endless housing having an open bottom and an air intake opening, said housing being adapted to cooperate with a support surface beneath said housing to define a substantially enclosed chamber;
   means for pressurizing air in said chamber sufficient to float the housing above the support surface; and
   means projecting from a bottom part of said housing laterally into said chamber to direct air inwardly within said chamber, said projecting means extending from said bottom part of said housing around substantially the entire perimeter of said housing to define said open bottom.

2. The apparatus of claim 1 wherein said projecting means is comprised of a relatively flat plate member projecting laterally into the chamber for directing at least some of the air in the chamber substantially laterally relative to the support surface and inwardly within said chamber.

3. The apparatus of claim 2 wherein said plate member has an arcuate slot formed in a first predetermined portion of said plate member and a plurality of openings formed in a second predetermined portion of said plate member.

4. The apparatus of claim 3 wherein said arcuate slot extends along an arc of approximately 180 degrees in the first predetermined portion of said plate member and said plurality of openings are circular openings arranged such that the respective centers thereof lie along an arc of approximately 180 degrees in the second predetermined portion of said plate member.

5. The apparatus of claim 2 wherein said housing is comprised of inner and outer shrouds, said outer shroud substantially enveloping said inner shroud to define a first chamber between the inner and outer shrouds and a second chamber within the inner shroud, said plate member extending from a bottom portion of said inner shroud to a corresponding bottom portion of said outer shroud and having a plurality of openings at spaced intervals to permit air flow between the first and second chambers through said openings.

6. The apparatus of claim 1 wherein said apparatus is a vacuum cleaner, said apparatus further including a shroud located in said housing for defining a first chamber between the housing and shroud and a second chamber inside the shroud, said means for pressurizing air including first and second air moving means respectively located within the first and second chambers, one of said air moving means being adapted to pressurize air within a corresponding chamber to float the housing and shroud above the support surface, said corresponding chamber being a pressure chamber, the other one of said air moving means being adapted to exhaust air from the other chamber to create a vacuum for suctioning material from the support surface beneath the housing, the other chamber being a vacuum chamber, said housing having an inlet opening for supplying air to the pressure chamber, said apparatus further including means communicating with the vacuum chamber for collecting material exhausted therefrom.

7. The vacuum cleaner of claim 6 further including means for agitating material on the support surface beneath the housing to facilitate introduction of material into the vacuum chamber.

8. The vacuum cleaner of claim 7 wherein said agitating means includes a flexible blade member rotatably mounted within the housing, said blade member having a plurality of bristle elements disposed at each end thereof and being adapted to contact the support surface to agitate dust and debris thereon when said blade member is rotated.

9. The vacuum cleaner of claim 8 wherein said vacuum chamber communicates with said pressure chamber, such that at least some of the air in said pressure chamber escapes into said vacuum chamber from beneath said shroud, said escaping air for carrying material stirred up by said agitating means into the vacuum chamber.

10. The vacuum chamber of claim 7 wherein said shroud is an endless shroud, said agitating means being rotatable for stirring up dust and debris from said support surface around substantially the entire bottom part of said shroud, such that said dust and debris are introduced into said vacuum chamber around substantially the entire bottom part of said shroud.

11. The vacuum cleaner of claim 6 wherein said projecting means includes means projecting into said second chamber from a bottom part of said shroud for directing air inwardly within said second chamber.

12. The vacuum cleaner of claim 11 wherein said means projecting into said second chamber is comprised of a relatively flat plate member projecting laterally into the second chamber around substantially the entire bottom part of such shroud.

13. The vacuum chamber of claim 6 wherein said projecting means includes a relatively flat plate member extending between a bottom part of said shroud and a corresponding bottom part of said housing, said plate member having a plurality of spaced-apart apertures, such that said first chamber communicates with said second chamber to permit air flow therebetween through said apertures.

14. The vacuum cleaner of claim 13 wherein said shroud is an endless shroud, said plate member being an endless plate member for spanning between the shroud and housing along substantially the entire respective bottom parts thereof.

15. The apparatus of claim 1 wherein said apparatus is a vacuum cleaner, said vacuum cleaner including means for dividing said chamber into a pressure chamber and a vacuum chamber, said means for pressurizing air including means for pressurizing air in the pressure chamber to float the housing above the support surface, said vacuum cleaner including means for exhausting air from the vacuum chamber to suction material from the support surface beneath the housing and means communicating with the vacuum chamber to collect material exhausted therefrom.

16. The apparatus of claim 1 wherein said apparatus is a cutting apparatus having rotatable cutting means located in the chamber and means protruding below the housing for contacting the support surface to enhance the stability of the cutting apparatus, said means protruding below said housing including at least one elongated runner.

17. The apparatus of claim 1 wherein said apparatus is a cutting apparatus having rotatable cutting means located in said chamber, said housing including a first portion in which said means for pressurizing air and said projecting means are located and a second portion, laterally disposed with respect to said first portion, in which said cutting means is located.

18. The apparatus of claim 1 wherein said apparatus is a cutting apparatus having a first and second rotatable cutting means, said housing having a first portion in which said first cutting means is located and a second portion, laterally disposed with respect to said first portion, in which said second cutting means is located, at least a portion of said second cutting means extending outwardly from the second portion of said housing when said second cutting means is rotated.

19. The apparatus of claim 1 wherein said apparatus further includes an axle, first and second wheels mounted on the axle and first and second attachment members coupled between the housing and the axle, said first and second attachment members being mounted with the axle such that the housing is able to float with respect to the wheels, said apparatus further including means for adjusting the position of each of said wheels relative to said housing.

20. An apparatus, comprising, in combination:
a substantially endless housing having an air intake opening and a downwardly depending side from which a relatively flat member projects laterally inward, the relatively flat member extending from substantially the entire side of the housing, a laterally extending top surface of said relatively flat member defining at least a partially enclosed chamber within the housing and a laterally extending bottom surface of said relatively flat member defining a bottom lifting surface, the chamber having an open bottom defined by an inside edge of the relatively flat member; and
means for pressurizing air in said chamber wherein an inner wall of the side and the relatively flat member cooperate to direct at least some of the pressurized air downwardly and then laterally inward within the chamber to maintain a relatively constant air pressure therein and float the housing above a support surface, at least some of the pressurized air acting on the lifting surface to enhance the floatation of the housing and the stability of the apparatus.

21. The apparatus of claim 17 further including rotatable cutting means mounted in the housing and a discharge duct extending through said housing, cuttings being centrifuged by the rotary action of said cutting means onto the top surface of said relatively flat member and being conveyed by air pressure in said chamber into said discharge duct.

22. A cutting apparatus, comprising:
a substantially endless housing having an open bottom, said housing being adapted to cooperate with a support surface beneath said housing to define a substantially enclosed chamber;
rotatable cutting means located in the chamber; and
means projecting from a bottom part of said housing laterally into said chamber, said projecting means extending from said bottom part of said housing around substantially the entire perimeter of said housing to define said open bottom.

23. The cutting apparatus of claim 22 further including a discharge duct extending through said housing, cuttings being centrifuged in the housing by the rotary action of said cutting means, said projecting means being adapted to cooperate with an inner wall of said housing to channel the centrifuged cuttings into said duct.

24. A cutting apparatus, comprising, in combination:
a substantially endless housing having an open bottom and an air intake opening, said housing being adapted to cooperate with a support surface beneath said housing to define a substantially enclosed chamber;
rotatable cutting means located in the chamber;
means for pressurizing air in said chamber sufficient to float the housing above the support surface; and means projecting from a bottom part of said housing laterally into said chamber to direct air inwardly within said chamber, said projecting means extending from said bottom part of said housing around substantially the entire perimeter of said housing to define said open bottom.

25. The apparatus of claim 21 wherein said projecting means is comprised of a relatively flat plate member projecting laterally into the chamber for directing at least some of the air in the chamber substantially laterally relative to the support surface and inwardly within said chamber.

26. The apparatus of claim 22 wherein said plate member defines a platform protruding into said chamber from around substantially the entire perimeter of said housing.

27. The apparatus of claim 23 further including a discharge duct extending through said housing, cuttings being centrifuged in the housing by the rotary action of said cutting means, said platform being adapted to cooperate with an inner wall of said housing to channel the centrifuged cuttings into said duct.

28. The apparatus of claim 26 wherein said housing includes an outer shroud having a first air intake opening and an inner shroud having a second air intake opening, said outer shroud substantially surrounding said inner shroud to define a first chamber between the inner and outer shrouds and a second chamber within the inner shroud, said means for pressurizing air in the chamber including a first air impeller located in the first chamber and a second air impeller located int he second chamber, said cutting means being located in the second chamber, said first air impeller for producing an air flow in the first chamber and said second impeller for producing an air flow in the second chamber.

29. The apparatus of claim 25 wherein said projecting means is comprised of a relatively flat plate member attached to a bottom part of at least one of the shrouds.

30. The apparatus of claim 25 wherein said projecting means is comprised of first and second relatively flat plate members attached to respective bottom parts of said outer and inner shrouds, said first plate member projecting into said first chamber and said second plate member projecting into said second chamber, said first plate member being located above said second plate member.

* * * * *